United States Patent

Tamura et al.

[11] Patent Number: 6,040,860
[45] Date of Patent: Mar. 21, 2000

[54] IMAGING APPARATUS FOR SUPPLYING IMAGES WITH RICH GRADATION ACROSS THE ENTIRE LUMINANCE RANGE FOR ALL SUBJECT TYPES

[75] Inventors: Akihiro Tamura, Hirakata; Shigeo Sakaue, Toyonaka; Takeshi Hamasaki, Yao, all of Japan

[73] Assignee: Matsushita Electric Industrial Co., Ltd., Osaka, Japan

[21] Appl. No.: 08/809,714

[22] PCT Filed: Sep. 29, 1995

[86] PCT No.: PCT/JP95/01990

§ 371 Date: Mar. 28, 1997

§ 102(e) Date: Mar. 28, 1997

[87] PCT Pub. No.: WO96/10886

PCT Pub. Date: Apr. 11, 1996

[30] Foreign Application Priority Data

Sep. 30, 1994 [JP] Japan .................................. 6-236732
Oct. 6, 1994 [JP] Japan .................................. 6-242774

[51] Int. Cl.⁷ .................................................. H04N 5/208
[52] U.S. Cl. ........................... 348/252; 348/255; 358/521
[58] Field of Search .................................... 348/207, 222, 348/229, 254, 255, 256, 252, 625; 358/521, 522, 523; 382/266, 274, 275; H04N 5/20

[56] References Cited

U.S. PATENT DOCUMENTS 4,314,272  2/1982  Miyaji et al. ........................... 348/255
5,221,963  6/1993  Hashimoto et al. .
5,260,873  11/1993 Hishinuma .
5,659,358  8/1997  Hieda ....................................... 348/255

FOREIGN PATENT DOCUMENTS

0613294A1  8/1994  European Pat. Off. .
4106825A1  9/1991  Germany .
61-96876   5/1986  Japan .
3-96078    4/1991  Japan .
4-86074    3/1992  Japan .
4-94272    3/1992  Japan .
4-340875   11/1992 Japan .
4-363976   12/1992 Japan .
5-75896    3/1993  Japan .
6-70228    3/1994  Japan .
6-253176   9/1994  Japan .

*Primary Examiner*—Tuan Ho
*Attorney, Agent, or Firm*—Wenderoth, Lind & Ponack, L.L.P.

[57] ABSTRACT

A gradation compensation circuit for gradation compensating the luminance level of the image signal is disclosed. An image evaluator evaluates the amount of backlighting and normal lighting in the overall image, and defines the degree of gradation compensation to be applied by the gradation compensation circuit according to the result of image evaluation. An AGC circuit maintains the overall luminance of the image constant. When the AGC control signal applied to the AGC circuit is high, the degree of compensation is suppressed, but when the AGC control signal is low, the degree of compensation is used without being suppressed.

10 Claims, 23 Drawing Sheets

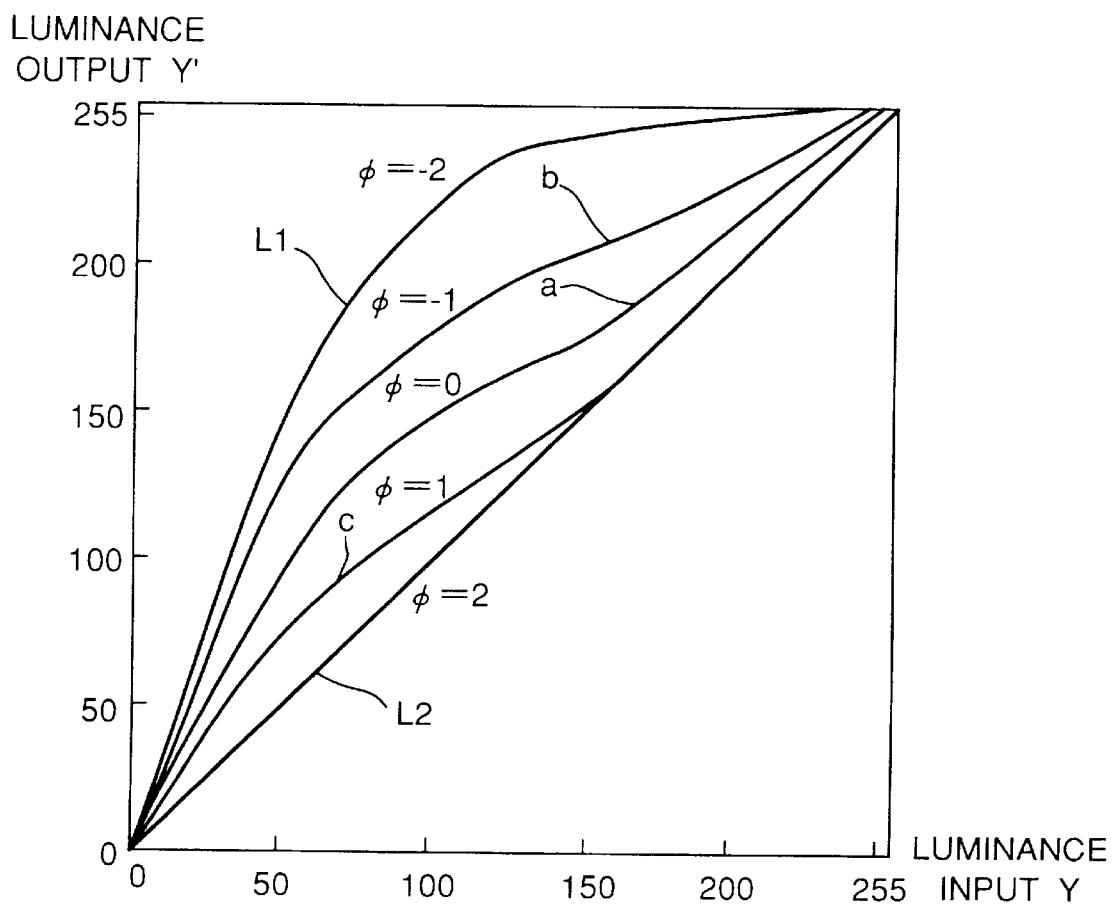

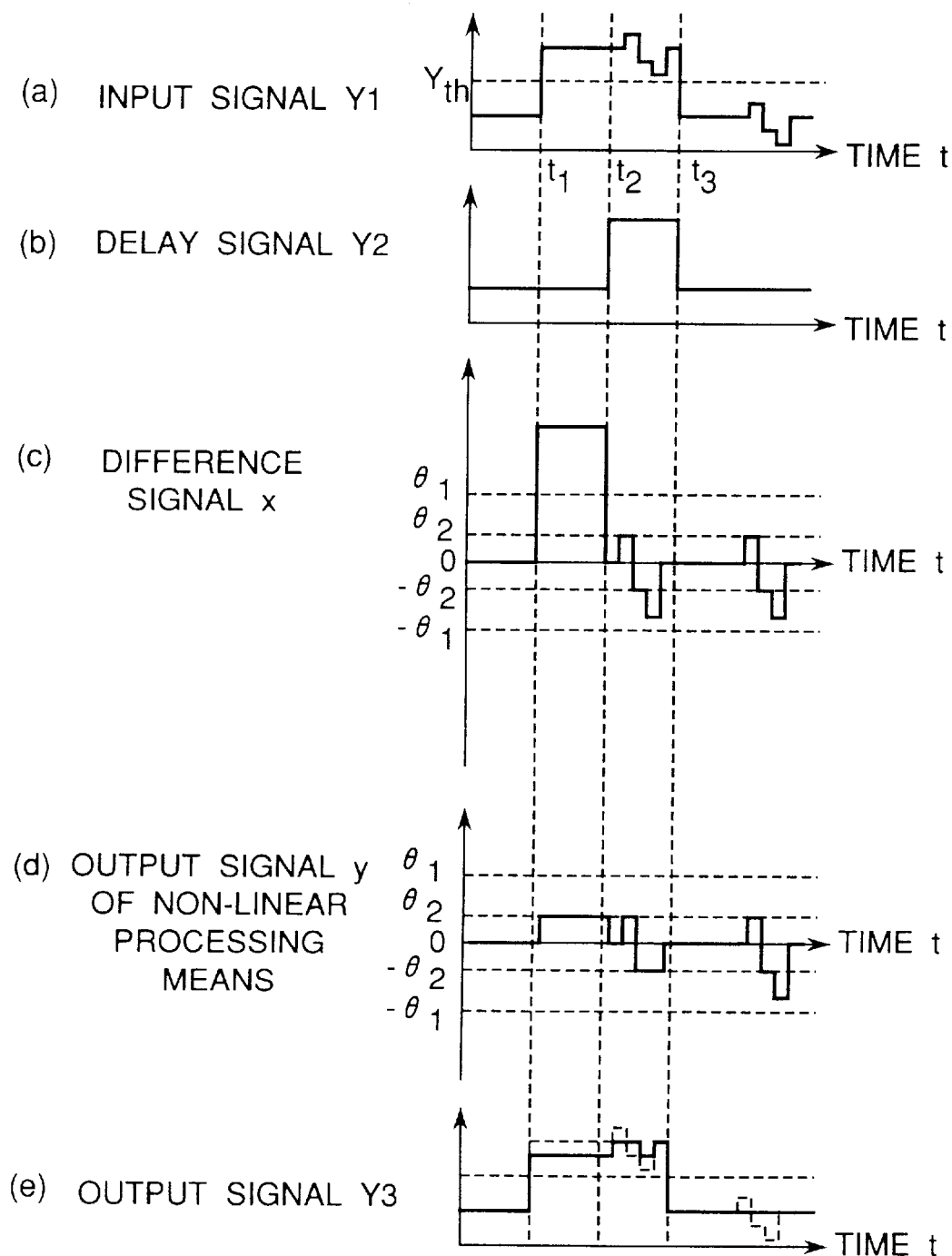

IMAGING APPARATUS FOR SUPPLYING IMAGES WITH RICH GRADATION ACROSS THE ENTIRE LUMINANCE RANGE FOR ALL SUBJECT TYPES

FIELD OF THE INVENTION

The present invention relates to an imaging apparatus for applying gradation compensation processing to obtain rich gradation with inconspicuous noise from an image in which the main subject is fuzzy and has little gradation due, for example, to imaging under backlighting conditions.

BACKGROUND OF THE INVENTION

Many imaging apparatuses equipped with a backlighting compensation means have been developed in recent years. One such imaging apparatus is disclosed in Japanese Patent Laid-Open Publication (tokkai) H4-340875 (1992-340875) and described below.

FIG. 23 is a block diagram of the imaging apparatus disclosed in Japanese Patent Laid-Open Publication (tokkai) H4-340875 (1992-340875). Referring to FIG. 23, this imaging apparatus comprises a lens 1; aperture mechanism 2; imaging element 3; a preamplifier 4 for amplifying the output from the imaging element 3 to an acceptable level; an integration circuit 5; an aperture control circuit 6; a process circuit 7 comprising a gamma correction circuit and white balance circuit; an automatic gain control (AGC) circuit 8; an integration circuit 9; an AGC control circuit 10 for generating a signal controlling the gain of the AGC circuit 8; an A/D converter 11 for analog-digital conversion of the image signal output from the AGC circuit 8; an image segmentation circuit 12 for segmenting the A/D-converted signal into plural segments; a multiplier 13 for calculating an evaluation value for the brightness of each signal segment in the segmented signal output by the image segmentation circuit 12; a frequency distribution calculator 14 for obtaining the frequency distribution of the signal segment brightness levels by counting the number of signal segments at each brightness level; an interface circuit 15 for inputting the output of the multiplier 13 and the output of the frequency distribution calculator 14 to the microprocessor 16; a D/A converter 17 for converting the digital signal output of the microprocessor 16 to an analog signal; a control signal generator 18 for generating a control signal according to the output from the D/A converter 17; a gain control circuit 19 for controlling the image signal gain based on the control signal output from the control signal generator 18; a camera signal processing circuit 20; and a signal output terminal 21.

The imaging apparatus thus comprised operates as follows.

The amount of light passing the lens 1 is limited by the aperture mechanism 2, converted to an electrical signal by the imaging element 3, and then amplified by the preamplifier 4. The output from the preamplifier 4 is integrated by the integration circuit 5, thus producing a dc signal corresponding to the output signal level from the preamplifier 4. This dc signal is supplied to the aperture control circuit 6.

The aperture control circuit 6 then compares the dc signal level input from the integration circuit 5 with a reference voltage to generate and output a control signal causing the aperture mechanism 2 to operate such that the output signal level of the preamplifier 4 is constant.

The output from the preamplifier 4 is also supplied to the process circuit 7 for gamma correction and white balance control, and is then output to the AGC circuit 8. The output of the AGC circuit 8 is integrated by another integration circuit 9, thus producing a dc signal based on the output signal level of the AGC circuit 8. This dc signal is then compared by the AGC control circuit 10 with a reference voltage to generate an AGC control signal used to control the AGC circuit 8 to output at a constant output signal level.

The output from the AGC circuit 8 is then converted to a digital signal by the A/D converter 11, and the resulting digital signal is segmented by the image segmentation circuit 12 into plural signal segments corresponding to specific image areas on screen. The multiplier 13 then detects the average luminance distribution of the video signal in each image segment as the exposure value of each segment, and the frequency distribution calculator 14 obtains the luminance distribution in each segment. The microprocessor 16 then determines the correlation between the image center and the other image segments, and defines as the main subject area the area with a correlation to the image center, and defines the other image areas as secondary subject areas. Based on the ratio of main subject areas to secondary subject areas, the microprocessor 16 then detects backlighting and strong normal lighting to control the image signal gain according to the backlighting-normal lighting ratio.

When controlling the image signal gain, compensation is applied so that gain is greater in the low luminance areas than in the high luminance level areas of the video signal. As a result of this process, the gradation characteristics of dark image areas are compensated so that an image signal with contrast is output from the gain control circuit 19. This signal is then variously processed by the signal processing circuit 20 to produce the video signal output from the signal output terminal 21.

It should be noted that the conventional technology described above detects the rate of the backlighting and strong normal lighting and controls the video signal gain according to this rate. When controlling the video signal gain the gain for low luminance level image areas is made higher than the gain for high luminance level areas in the image signal. It is therefore possible to provide gradation correction to dark image areas but at a cost of increasing the signal-to-noise (S/N) ratio in low luminance parts of the image signal.

An imaging apparatus comprising a gradation compensation circuit for improving the S/N ratio of low luminance image areas has been previously disclosed in previous filings by the inventors, specifically in U.S. Ser. No. 08/201,426 (Feb. 24, 1994) and EP Appln. No. 94 102 684.1 (Feb. 23, 1994). The problem with said apparatus, however, is insufficient improvement of the S/N ratio.

SUMMARY OF THE INVENTION

Therefore, the object of the present invention is to resolve the aforementioned problems by providing an imaging apparatus whereby an output image with rich gradation can be obtained across the full range of subject lighting from normal to strongly backlit subjects without degrading the S/N ratio in low luminance image signal areas and while preventing loss or blurring of black and white definitions.

To achieve the above object, an imaging apparatus according to the present invention comprises an imaging element for outputting an image signal; an AGC circuit for controlling the gain of the image signal output from the imaging element; an AGC control means for controlling the output signal level of the AGC circuit to a constant level; a gradation compensation means for applying gradation compensation by varying the gain of each luminance level in the image signal output of the AGC circuit based on a gradation compensation coefficient; a feature quantity extraction means for extracting the feature quantities of the image from the image signal output of the AGC circuit; an image evaluation means for determining the amount of backlighting and strong normal lighting from the feature quantity extracted by the feature quantity extraction means, and outputting the degree of gradation compensation to be applied; and a gradation compensation suppression means for suppressing the degree of gradation compensation output from the image evaluation means and determining the gradation compensation coefficient according to the control signal from the AGC control means.

An imaging apparatus according to a further embodiment of the invention comprises an imaging element for outputting an image signal; a gradation compensation means for applying gradation compensation by varying the gain of each luminance level in the image signal output of the imaging element based on a gradation compensation coefficient; a signal processing circuit for applying contour enhancement and other signal processing to the image signal output of the gradation compensation means; a feature quantity extraction means for extracting the feature quantities of the image in the image signal output of the imaging element; an image evaluation means for determining the amount of backlighting and strong normal lighting from the feature quantity extracted by the feature quantity extraction means, and outputting the gradation compensation coefficient; and a contour signal gain control means for controlling the gain of the contour-enhanced signal output by the signal processing circuit based on the gradation compensation coefficient set by the image evaluation means.

A further embodiment of an imaging apparatus according to the present invention comprises an imaging element for outputting an image signal; a gradation compensation means for applying gradation compensation by varying the gain of each luminance level in the image signal output of the imaging element based on a gradation compensation coefficient; a signal processing circuit for applying contour enhancement and other signal processing to the image signal output of the gradation compensation means; a feature quantity extraction means for extracting the feature quantities of the image in the image signal output of the imaging element; an image evaluation means for determining the amount of backlighting and strong normal lighting from the feature quantity extracted by the feature quantity extraction means, and outputting the gradation compensation coefficient; and a noise reduction control means for controlling the noise suppression characteristic of the signal processing circuit based on the gradation compensation coefficient set by the image evaluation means.

By means of the above configuration, the imaging apparatus of the invention varies the gradation compensation coefficient set by the gradation compensation suppression means according to the AGC control signal of the AGC control means, and suppresses the gain of the gradation compensation means to output a gradation-compensated image signal. The imaging apparatus of the invention can thereby obtain a gradation compensated image of the input image without conspicuous noise.

The imaging apparatus of the invention configured as described above controls the gradation compensation means according to the gradation compensation coefficient output by the image evaluation means to accomplish gradation compensation, and the contour signal gain control means controls the contour signal gain based on the gradation compensation coefficient of the image evaluation means so that the gain of the contour enhancement signal in low luminance image areas is reduced. The imaging apparatus of the invention can thereby obtain a gradation compensated image of the input image without conspicuous noise.

The imaging apparatus of the invention alternatively configured as described above controls the gradation compensation means according to the gradation compensation coefficient output by the image evaluation means to accomplish gradation compensation, and controls the operating characteristics of the noise suppression control means according to the gradation compensation coefficient of the image evaluation means. This configuration of the invention can therefore also obtain a gradation compensated image of the input image without conspicuous noise.

BRIEF DESCRIPTION OF THE DRAWINGS

The present invention will become more fully understood from the detailed description given below and the accompanying diagrams wherein:

FIG. 10 is a graph of the gradation compensation characteristic in a preferred embodiment of the invention.

FIG. 18C is a waveform diagram of selected signals in the fifth embodiment of the invention.

DESCRIPTION OF PREFERRED EMBODIMENTS

The preferred embodiments of the present invention are described below with reference to the accompanying figures.

Embodiment 1

Figure 1:
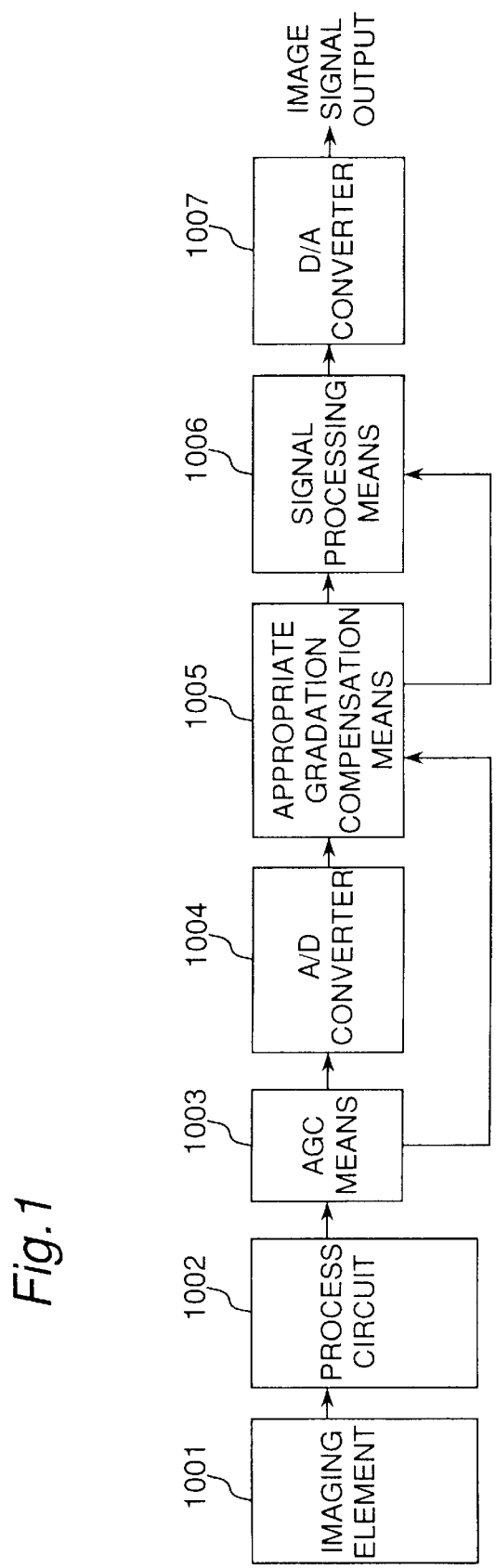
FIG. 1 is a block diagram of an imaging apparatus according to a first embodiment of the invention.

FIG. 1 is a block diagram of an imaging apparatus according to a first embodiment of the invention. As shown in FIG. 1 the imaging apparatus of the first embodiment comprises an imaging element 1001, a process circuit 1002 comprising a gamma correction circuit and white balance circuit, an AGC means 1003, an A/D converter 1004 for A/D converting the image signal output of the AGC means 1003, an appropriate gradation compensation means 1005, a signal processing means 1006, and a D/A converter 1007 for D/A converting the image signal output of the signal processing means 1006.

Note that the appropriate gradation compensation means 1005 applies gradation compensation according to the input image. The signal processing means 1006 then applies a different signal processing operation to the gradation-compensated image signal output from the appropriate gradation compensation means 1005 based on the gain used by the appropriate gradation compensation means 1005 for the appropriate gradation compensation operation.

The operation of the imaging apparatus according to the first embodiment thus comprised is described below.

The image signal generated by the imaging element 1001 is first processed by the process circuit 1002 for gamma correction, white balance control, and other operations as needed, and is then input to the AGC means 1003. The image signal output from the AGC means 1003 is then converted to a digital signal by the A/D converter 1004.

The AGC means 1003 obtains the average of the total screen and the average of the screen center from the output signal of the A/D converter 1004, adds the averages, and obtains the integrated average. The obtained integrated average is thus normalized to the output level range of the AGC means 1003, and the output signal level of the AGC means 1003 is controlled to a constant level using the AGC control signal generated by comparing the normalized integrated average with a reference value.

The image signal converted to a 256-level (0–255) digital signal by the A/D converter 1004 is then input to the appropriate gradation compensation means 1005. The appropriate gradation compensation means 1005 determines the degree of compensation of the gradation compensation characteristic to be applied based on the input image. The compensation gain is then set by suppressing the degree of compensation according to the AGC control signal of the AGC means 1003. The timing of the image signal is adjusted to the compensation gain by a delay circuit, multiplied with the compensation gain by a multiplier, and the gradation-compensated image signal is output.

The signal processing means 1006 then applies a signal processing operation that differs according to the compensation gain of the appropriate gradation compensation means 1005 to the gradation-compensated image signal output by the appropriate gradation compensation means 1005. For example, this different signal processing operation could control the detail gain of the detail compensation circuit inversely proportional to the compensation gain, or enhance the noise reduction of the noise reduction circuit according to the compensation gain. The D/A converter 1007 then converts the digital image signal to the analog image signal output therefrom.

Thus comprising an imaging element 1001, a process circuit 1002 comprising a gamma correction circuit and white balance circuit, an AGC means 1003, an A/D converter 1004 for A/D converting the image signal output of the AGC means 1003, an appropriate gradation compensation means 1005 for applying gradation compensation according to the input image, a signal processing means 1006 for signal processing the gradation-compensated image signal output from the appropriate gradation compensation means 1005, and a D/A converter 1007 for D/A converting the image signal output of the signal processing means 1006, the imaging apparatus of the invention can link the operation of the AGC means 1003 and the appropriate gradation compensation means 1005 by means of the AGC control signal, and can link the appropriate gradation compensation means 1005 and signal processing means 1006 by means of the compensation gain.

As a result, the imaging apparatus of the invention can produce an output image with rich gradation across the entire gradation range without gradation loss or conspicuous noise from subjects imaged in a lighting conditions ranging from backlit to normal lighting.

Embodiment 2

Figure 2:
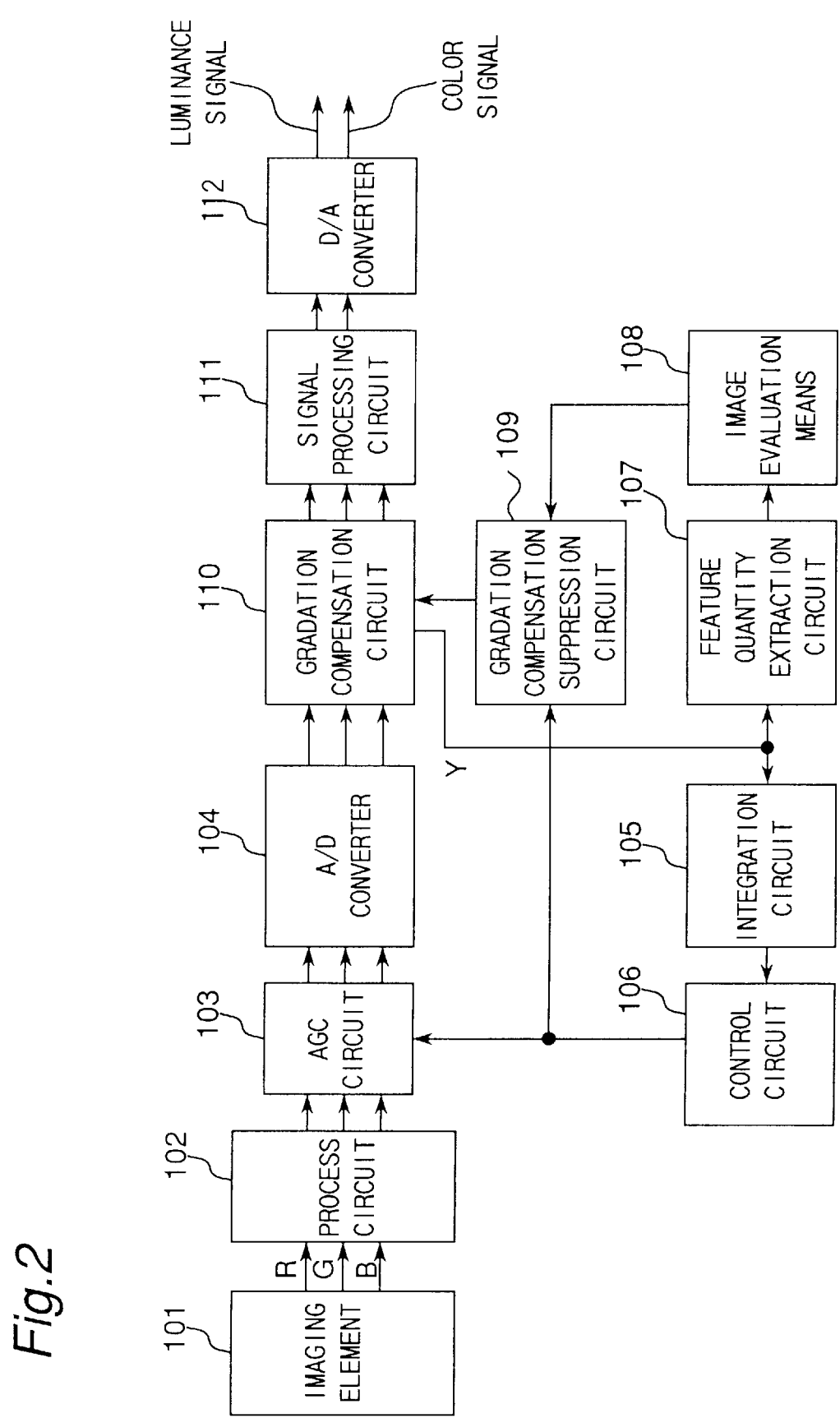
FIG. 2 is a block diagram of an imaging apparatus according to a second embodiment of the invention.

FIG. 2 is a block diagram of an imaging apparatus according to a second embodiment of the invention.

As shown in FIG. 2 the imaging apparatus of the second embodiment comprises an imaging element 101, a process circuit 102 comprising a gamma correction circuit and white balance circuit, an AGC means 103, an A/D converter 104 for A/D converting the image signal output of the AGC means 103, an integration circuit 105, an AGC control circuit 106 for generating a signal controlling the gain of the AGC means 103, a feature quantity extraction circuit 107 for extracting the feature quantities of the image signal, an image evaluation means 108 for evaluating the backlighting and strong normal lighting of the input image, a gradation compensation suppression circuit 109 for setting the gradation compensation coefficient based on the output from the AGC control circuit 106 and the output from the image evaluation means 108, a gradation compensation circuit 110 for gradation compensating the output from the A/D converter 104 using the supplied gradation compensation coefficient, a signal processing circuit 111 for signal processing the gradation-compensated image signal input from the gradation compensation circuit 110, and a D/A converter 112 for D/A converting the image signal output of the signal processing circuit 111.

Figure 3:
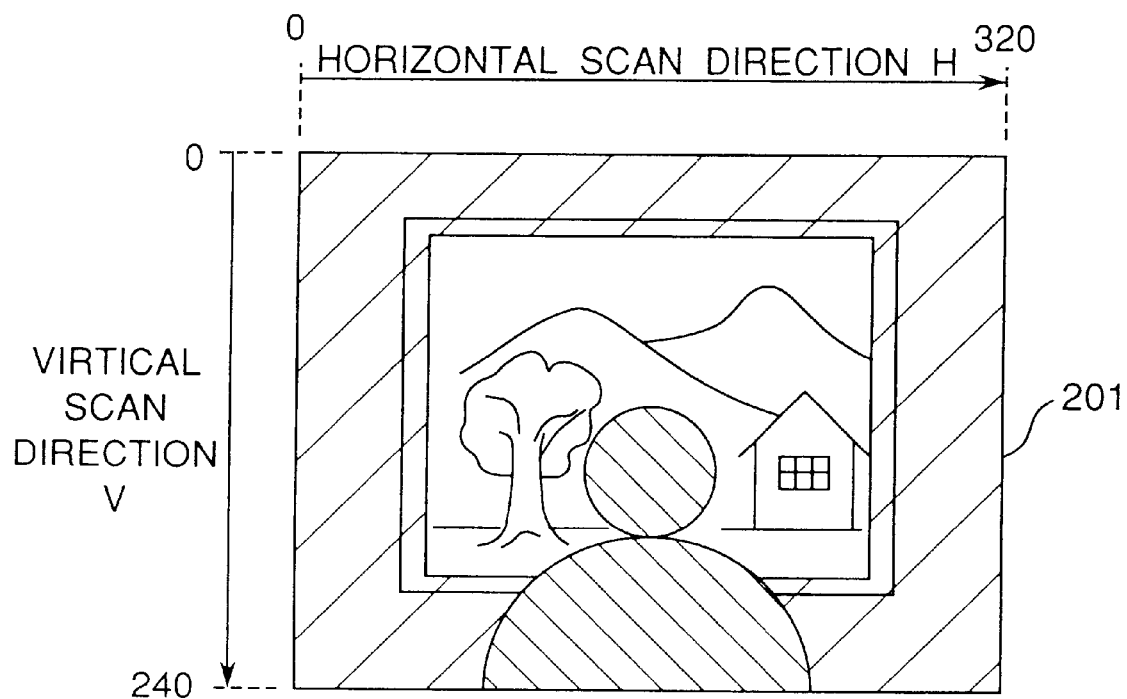
FIG. 3 shows the image in one field of the input image signal in a preferred embodiment of the invention.

FIG. 3 shows the image in one field of the input image signal in a preferred embodiment of the invention. The effective screen area 201 shown in FIG. 3 is 320 pixels wide in the horizontal scanning direction and 240 pixels high in the vertical scanning direction.

Figure 4:
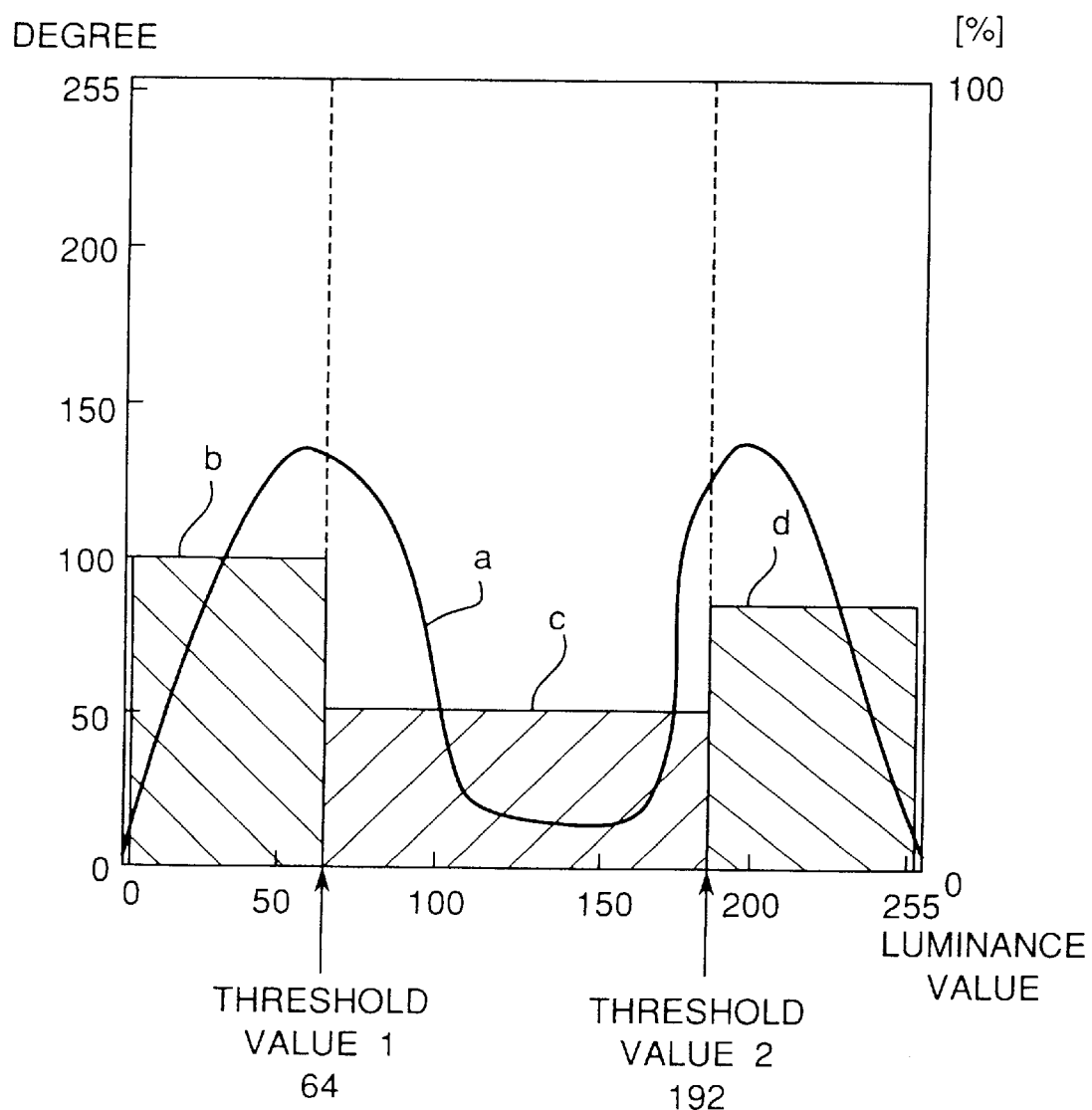
FIG. 4 is a sample luminance histogram showing the feature quantity extracted by the feature quantity extraction circuit 107 in a preferred embodiment of the invention.

FIG. 4 is a sample luminance histogram showing the feature quantity extracted by the feature quantity extraction circuit 107 in the present embodiment of the invention. Curve a in FIG. 4 is the luminance histogram where the low luminance pixel count of pixels with a luminance value less than or equal to threshold value 1 is level b, the middle luminance pixel count of pixels with a luminance value between threshold value 1 and threshold value 2 is level c, and the high luminance pixel count of pixels with a luminance value greater than or equal to threshold value 2 is level d.

Figure 5A:
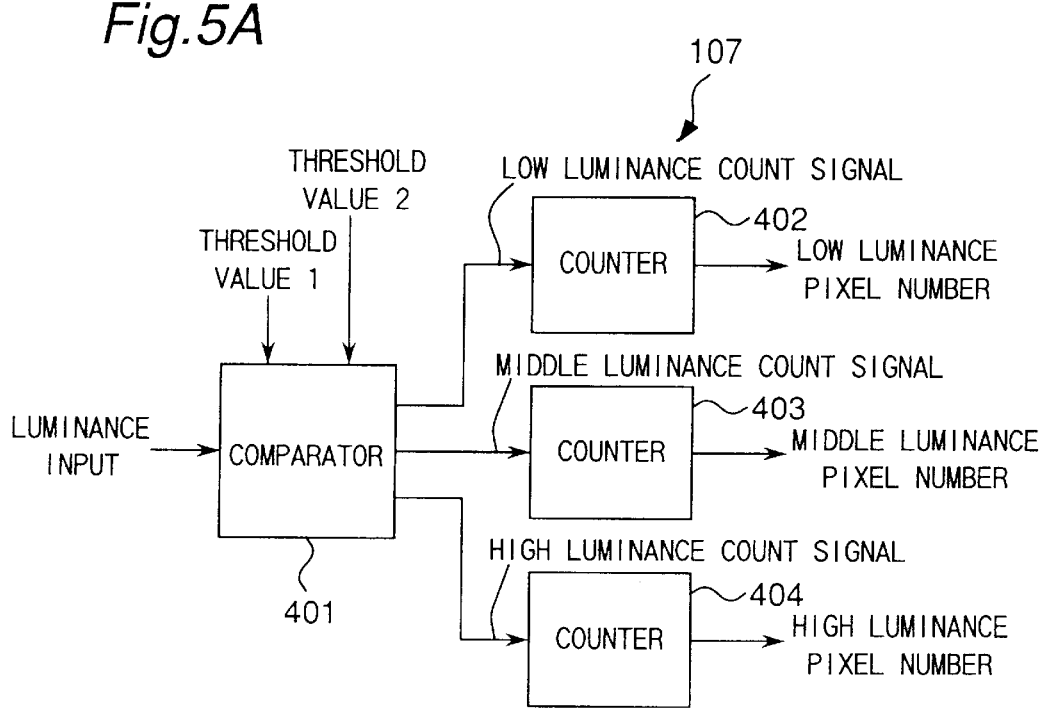
FIG. 5A is a block diagram of the feature quantity extraction circuit 107 shown in FIG. 2.

FIG. 5A is a block diagram of the feature quantity extraction circuit 107 shown in FIG. 2. Shown in FIG. 5A are a comparator 401, low luminance pixel counter 402 for counting the low luminance pixels, middle luminance pixel counter 403 for counting the middle luminance pixels, and high luminance pixel counter 404 for counting the high luminance pixels.

Figure 5B:
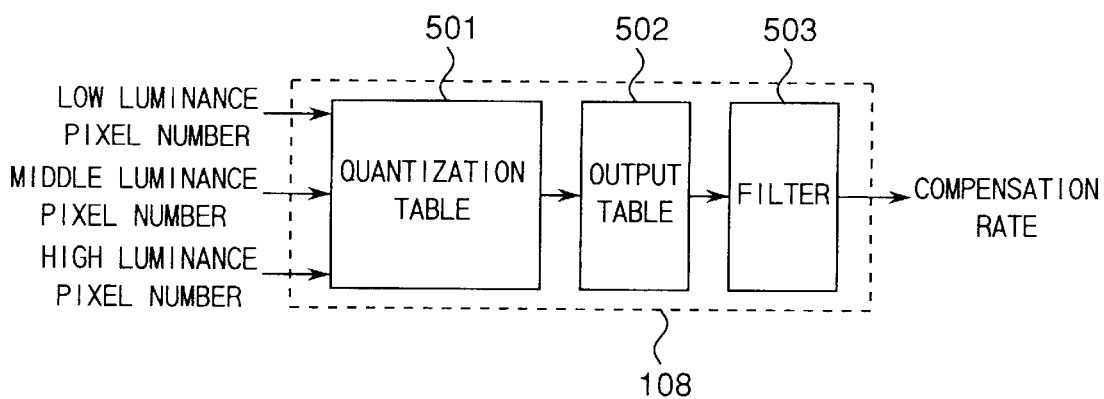
FIG. 5B is a block diagram of the image evaluation means 108 shown in FIG. 2.

FIG. 5B is a block diagram of the image evaluation means 108 shown in FIG. 2. Shown in FIG. 5B are the quantization table 501, output table 502, and filter 503.

Figure 6A:
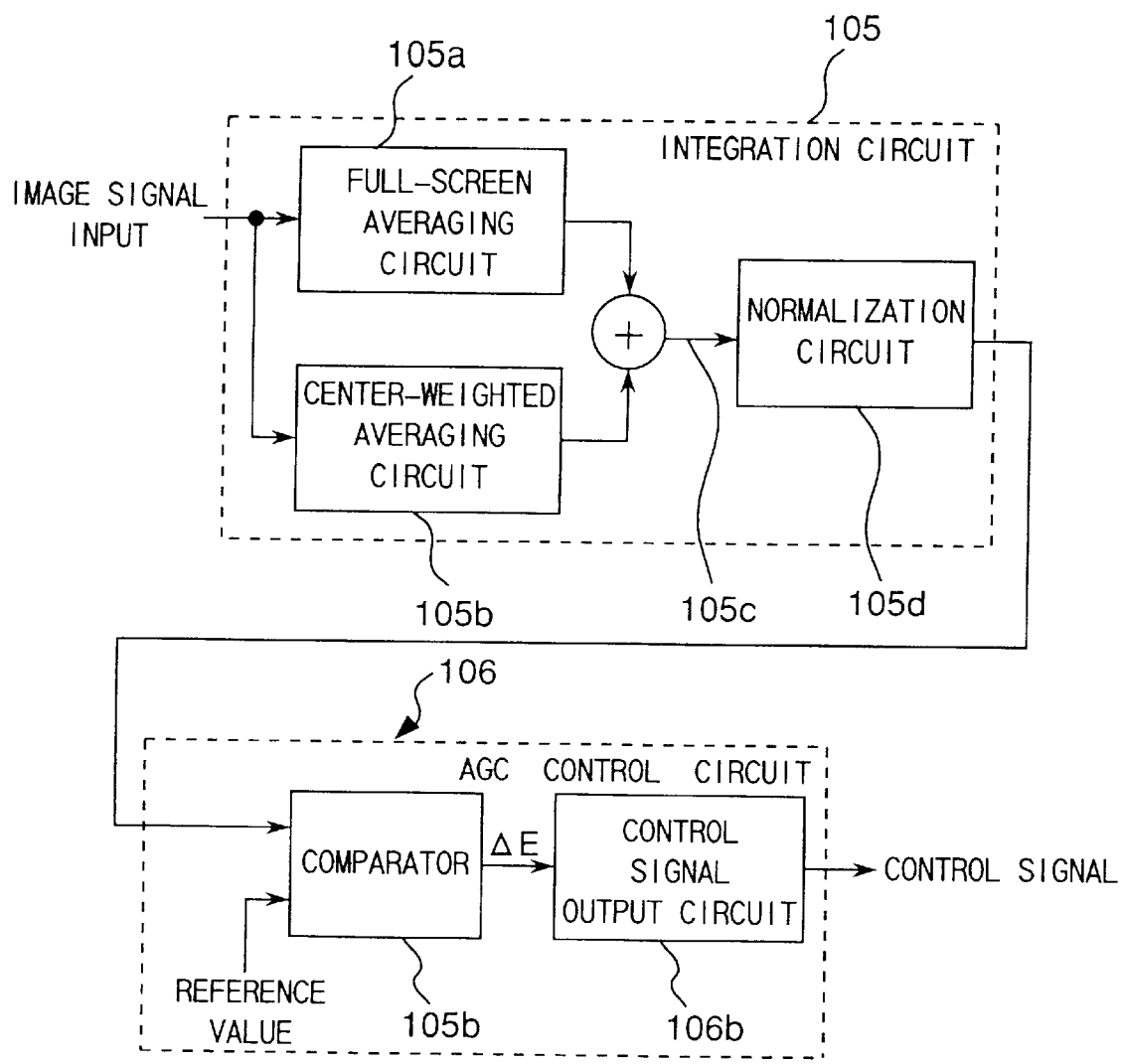
FIG. 6A is a block diagram of the integration circuit and AGC control circuit shown in FIG. 2.

FIG. 6A is a block diagram of the integration circuit 105 and AGC control circuit 106 shown in FIG. 2. As shown in FIG. 6A the integration circuit 105 comprises a full-screen averaging circuit 105a, center-weighted averaging circuit 105b, adder 105c, and normalization circuit 105d. The AGC control circuit 106 comprises a comparator 106a and AGC control signal output circuit 106b as also shown in FIG. 6A. Note that the comparator 106a compares the output from the normalization circuit 105d with a reference value, and outputs the resulting difference ΔE.

Figure 6B:
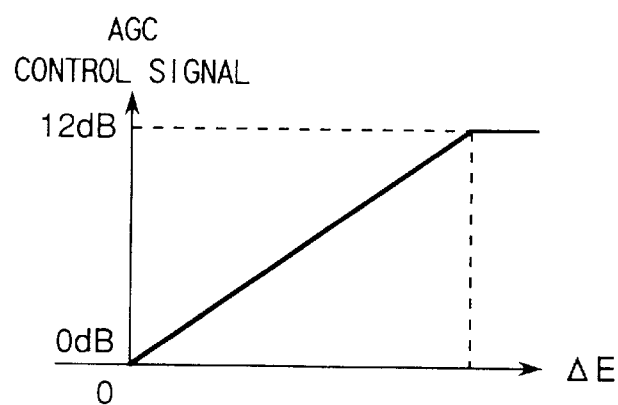
FIG. 6B is a graph of the AGC control signal.

FIG. 6B is a graph of the AGC control signal.

Figure 7:
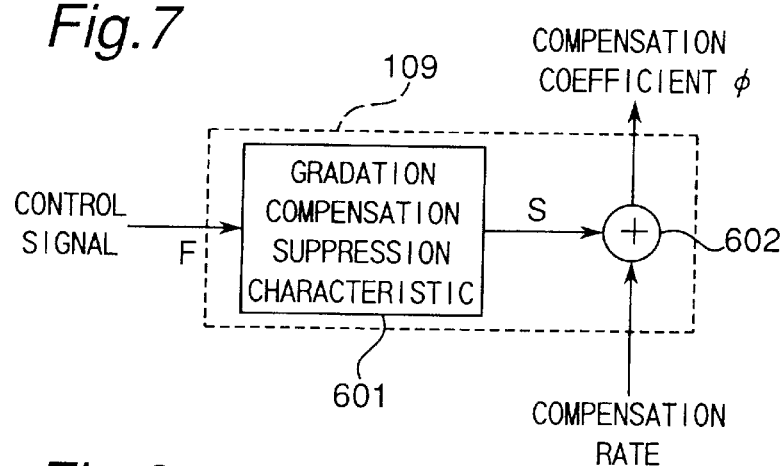
FIG. 7 is a block diagram of the gradation compensation suppression means 109 in a preferred embodiment of the invention.

FIG. 7 is a block diagram of the gradation compensation suppression means 109 in the present embodiment of the invention. The gradation compensation suppression circuit 109 comprises a gradation compensation suppression characteristic converter 601 and adder 602 as shown in the figure.

Figure 8:
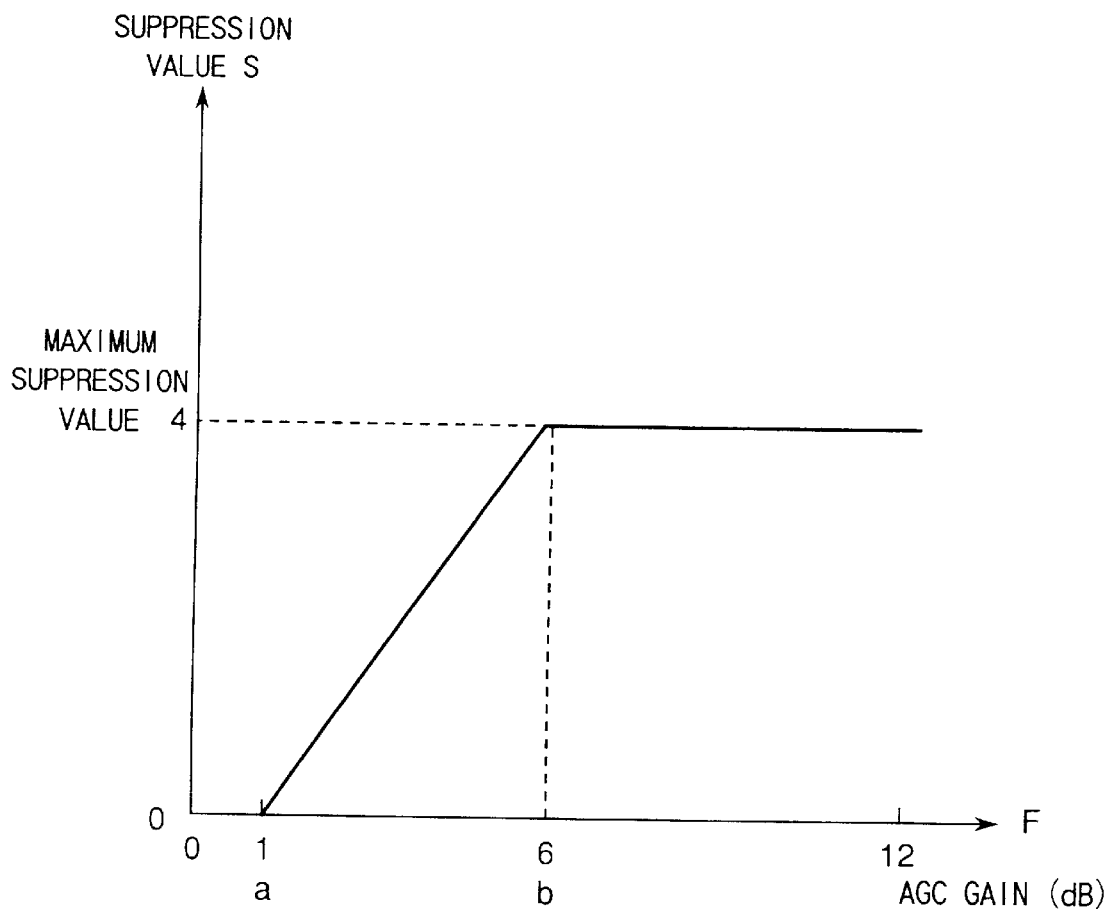
FIG. 8 is a graph of the gradation compensation suppression characteristic based on the AGC control signal in a preferred embodiment of the invention.

FIG. 8 is a graph of the gradation compensation suppression characteristic based on the AGC control signal in the present embodiment of the invention. The pre-suppression gain is shown as point a in FIG. 8, and the highest suppressed gain is shown as point b.

Figure 9A:
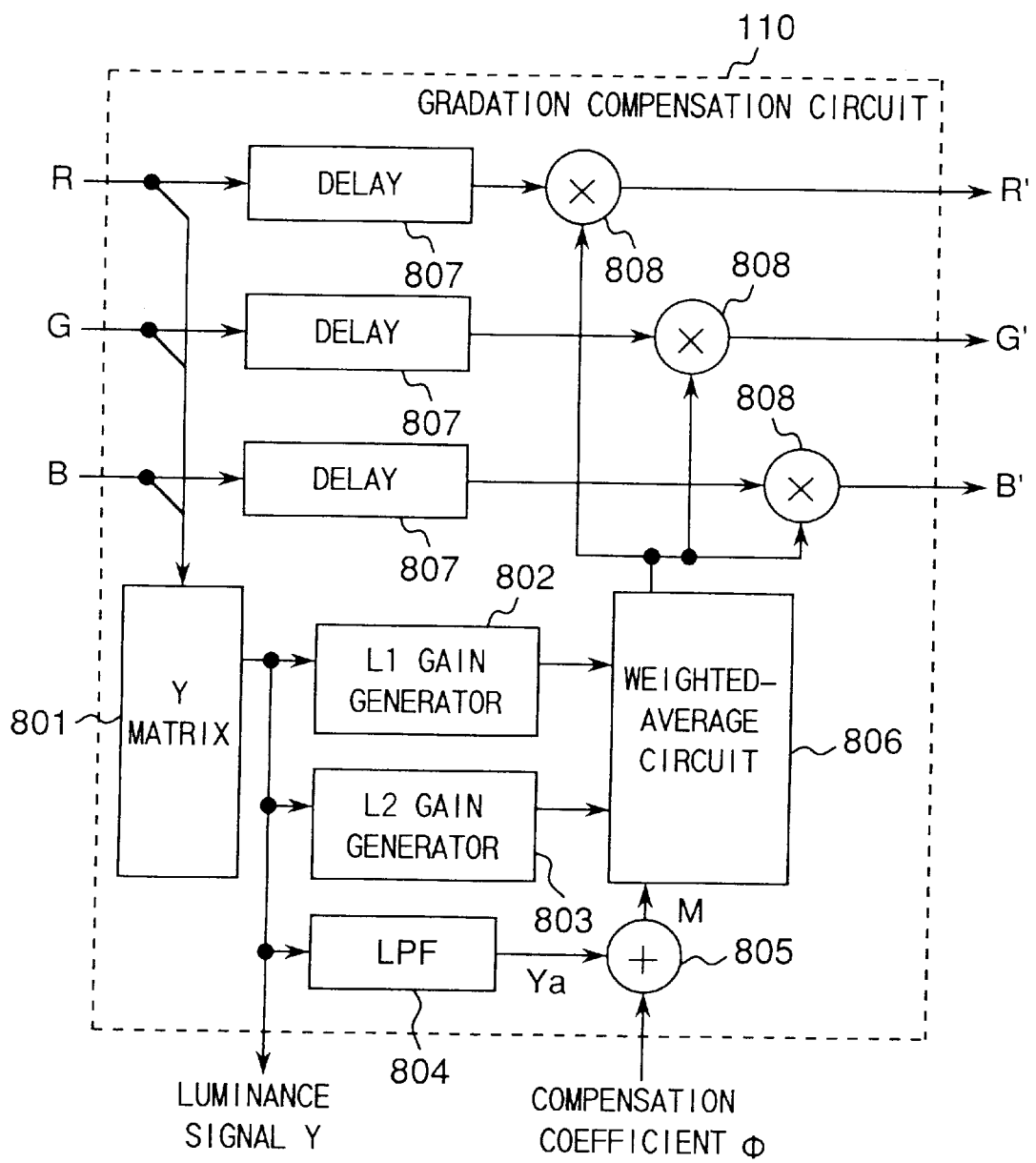
FIG. 9A is a block diagram of the gradation compensation circuit shown in FIG. 2.

FIG. 9A is a block diagram of the gradation compensation circuit shown in FIG. 2. As shown in FIG. 9A the gradation compensation circuit 110 comprises a Y matrix circuit 801, L1 gain generator 802, L2 gain generator 803, average luminance detecting circuit (LPF) 804, adder 805, weighted-average circuit 806, delay circuits 807, and multipliers 808.

FIG. 10 is a graph of the gradation compensation characteristic in the present embodiment of the invention.

Figure 11:
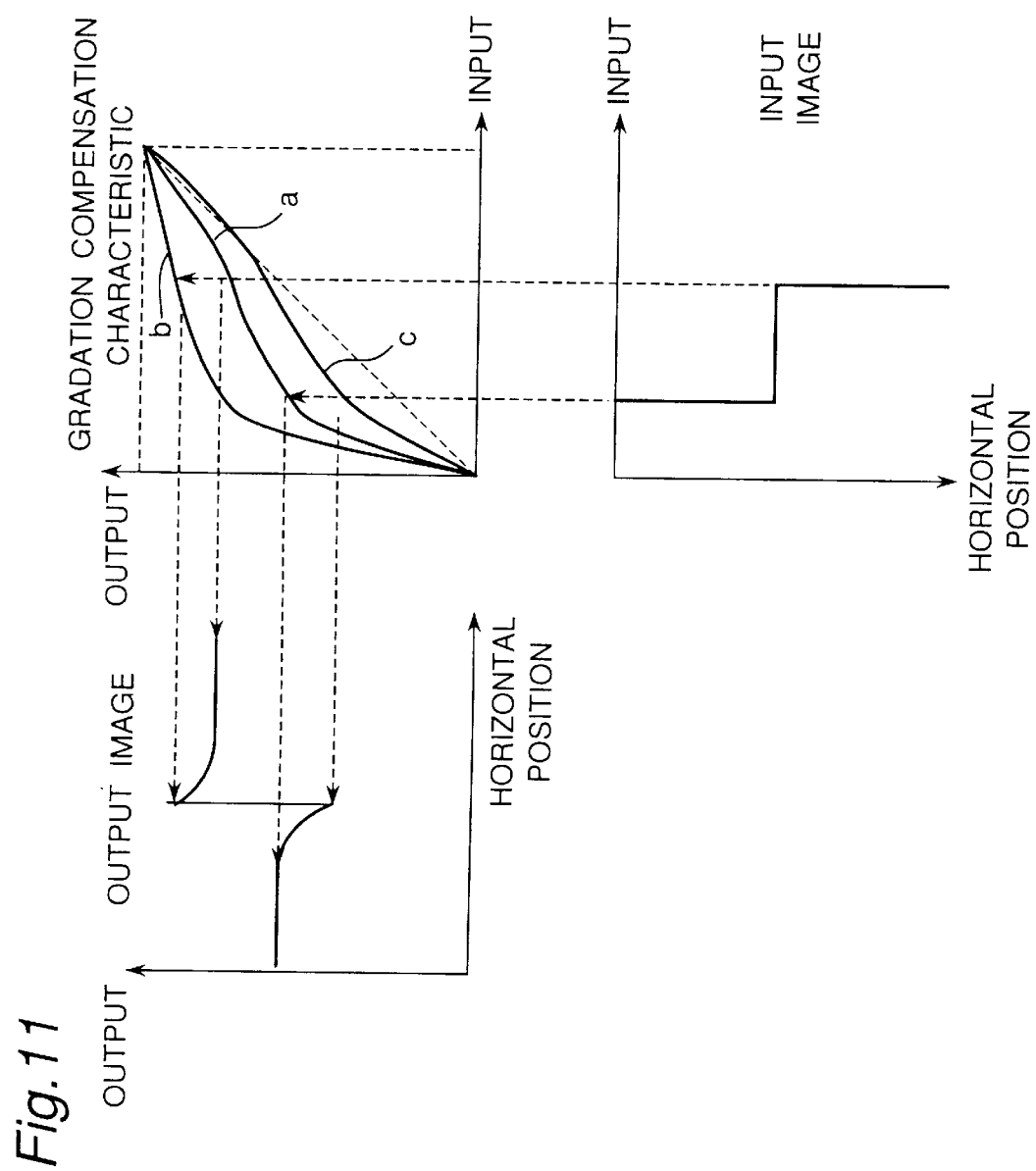
FIG. 11 is a graph of the gradation compensation characteristic and input/output characteristic in a preferred embodiment of the invention.

FIG. 11 is a graph of the gradation compensation characteristic and input/output characteristic in the present embodiment of the invention.

The operation of an imaging apparatus according to the second embodiment of the invention thus comprised is described below. Referring first to FIG. 2, the image signal captured by the imaging element 101 is first separated into the R, G, and B signal components which are then supplied to the process circuit 102. The process circuit 102 then processes the RGB signals for gamma correction, white balance control, and other operations as needed, and then outputs the signals to the AGC means 103. The RGB image signal output from the AGC means 103 is then converted to a digital signal by the A/D converter 104.

The A/D converter 104 outputs to the gradation compensation circuit 110, which then calculates the luminance signal Y by means of the Y matrix circuit 801 shown in FIG. 9A. This luminance signal Y is then supplied to the integration circuit 105 shown in FIG. 6A. The full-screen averaging circuit 105a of the integration circuit 105 calculates the average luminance of the overall screen (image) from the luminance signal Y. At the same time the center-weighted averaging circuit 105b calculates the average of the luminance signal Y in the middle of the screen, and then multiplies this average by a weight (for example, a multiplier of 2) to obtain the center-weighted average luminance of the image. The screen average and the center-weighted average luminance values are then added by the adder 105c, and this average sum signal is then normalized to the output level range of the AGC means 103 by the normalization circuit 105d, obtaining the integrated value that is then output to the AGC control circuit 106.

The comparator 106a of the AGC control circuit 106 $_1$S compares this integrated value with a reference value to obtain the difference signal ΔE. The AGC control signal output circuit 106b then generates the AGC control signal shown in FIG. 6B according to the difference signal ΔE, and outputs this AGC control signal from the AGC control circuit 106. This AGC control signal is used to maintain a constant output signal level from the AGC means 103.

More specifically, as shown by the output characteristics of the AGC control signal in FIG. 6B, if the integrated value is less than the reference value, i.e., if ΔE>0, the AGC control signal is generated and output to increase the gain so that the integrated value and the reference value are equal. The output signal level of the AGC means 103 is thus controlled to a constant level. Note that the AGC circuit of the invention is described in Japanese patent laid-open numbers (tokkai) 4-86074 and 4-94272, the content of which shall be considered part of the present invention.

The A/D converter 104 converts the RGB signals from the AGC means 103 to 256-level digital signals comprising levels 0–255, and outputs the digitized RGB signals to the gradation compensation circuit 110.

Note that a higher signal level produces a brighter color signal such that when R=G=B=255, the color is white. The Y matrix circuit 801 of the gradation compensation circuit 110 thus calculates the luminance signal Y from the RGB signal levels. If the input image signal luminance is Y, the luminance signal Y can be obtained using equation 1

$$Y = 0.30R + 0.59G + 0.11B \qquad (1)$$

and the digital signal levels are thus obviously values in the range 0–255. The calculated luminance signal Y is then input to the integration circuit 105 and feature quantity extraction circuit 107.

One field of a typical image input signal is shown in FIG. 3. In this picture a person is standing in front of a window, resulting in a scene with strong backlighting. The feature quantity extraction circuit 107 obtains the luminance histogram shown in FIG. 4 by counting the low, middle, and high luminance pixels in one 320×240 pixel field of the effective screen area 201 shown in FIG. 3 to obtain the luminance distribution across one complete field of the effective screen area 201.

This luminance histogram (FIG. 4bcd) shows that there are two luminance peaks with one in the low luminance range and one in the high luminance range. This makes it possible to deduce that the captured image contains a backlit subject. The image evaluation means 108 then sets the compensation rate of the gradation compensation characteristic used to compensate the input image based on the luminance histogram extracted by the feature quantity extraction circuit 107.

Details regarding this compensation rate are disclosed in U.S. patent application Ser. No. 08/201,426 (EP Appln. No. 94 102 684.1) previously filed by the present inventors, and the content thereof shall be considered included in this specification of the present invention.

The gradation compensation suppression circuit 109 then suppresses the compensation rate according to the AGC control signal of the AGC control circuit 106, and sets the gradation compensation coefficient.

The gradation compensation circuit 110 then obtains the gradation-compensated luminance signal Y' from the luminance signal Y and gradation compensation coefficient, calculates the compensation gain (Y'/Y), adjusts the timing of the RGB signals to the compensation gain using the delay circuits 807, multiplies the delayed signals by the compensation gain (Y'/Y) using the multipliers 808, and thus outputs the gradation-compensated RGB signals R', G', and B'.

By using the same compensation gain with all three RGB signals, an output image with good color balance and rich overall gradation can be obtained.

After gradation compensation is completed, other signal processing can be applied by the signal processing circuit 111, and the D/A converter 112 then re-converts the processed image signal to the analog image signal output from the imaging apparatus.

The gradation compensation circuit 110 thus operates to convert the input luminance signal Y to a brighter luminance signal Y'. As shown in FIG. 10, when there is no change in the luminance component, the input luminance signal Y and the output luminance signal Y' are equal, and the relationship between the two signals is expressed by a linear curve L2 with a slope of 45 degrees. When the luminance signal Y is changed to the greatest degree possible, the relationship between the two signals is expressed by curve L1. There are plural incremental relationship curves between L1 and L2 of which three examples, a, b, and c, are shown.

Curves L1 and L2 can be expressed by equations 3 and 4.

$$L1=1/255^2*(Y-255)^3+255 \tag{3}$$

$$L2=Y \tag{4}$$

Curves Y' between L1 and L2 can be obtained by weighted averaging using equation 2

$$Y'=\{L1*(255-M)+L2*M\}/255 \tag{2}$$

where M is a variable in the range 0–255 and defined by equation 5

$$M=Ya+64*\phi \tag{5}$$

where Ya is the average luminance detected by the average luminance detecting LPF 804, and φ is the compensation coefficient. For example, if the average luminance Ya is 127, the output luminance Y' will be obtained as follows when the value of the gradation compensation coefficient φ is 2, 0, and –2.

When φ=2

$$M=127+64*2=255$$

$$Y'=\{L1*(255-255)+L2*255\}/255=L2.$$

When φ=0

$$M=127+0=127$$

$$Y'=L1*128/255+L2*127/255\sim1/2L1+1/2L2.$$

When φ=–2

$$M=127-128\sim0$$

$$Y'=\{L1*255\}/255=L1.$$

In other words, curve L2 in FIG. 10 is obtained when φ=2, curve L1 is obtained when φ=–2, and curve a is obtained when φ=0. Likewise, when φ=–1 curve b is obtained, and curve c results when φ=1.

In the present invention the pre-suppression gradation compensation coefficient φ (hereafter compensation rate γ) is output from the image evaluation means 108. As the AGC control signal F increases (variable from 0–12 dB as shown in FIG. 6B), suppression level S increases, compensation coefficient φ is suppressed, and the output luminance signal converges to curve L2. The relationship between the AGC control signal F and the suppression level S is shown in FIG. 8 and expressed by equation 6.

When 0≦F<1 dB,

S=0 when 1 dB≦F≦6 dB $$S=(F-1)*4/5$$

when 6 dB<F $$S=4 \tag{6}$$

The compensation coefficient φ, compensation rate γ, and suppression level S is $$f=\gamma+S.$$

Therefore, because S=0 when the AGC control signal F is ≦1 dB, the compensation rate γ is used as is as the compensation coefficient φ. When the AGC control signal F is 6 dB or greater, S=4 and therefore φ=γ+4. Therefore, if the compensation rate γ is –2 (i.e., corresponding to curve L1), φ=–2+4=2, and the compensation coefficient φ is suppressed to +2 (i.e., curve L2 is used). While φ=–1+4=3 when the compensation rate γ is –1, the compensation coefficient φ cannot have a value greater than 2 and is therefore clipped and suppressed to +2.

The operation of the feature quantity extraction circuit 107 is described in detail below with reference to FIG. 5A.

The input luminance signal Y is compared with threshold values 1 and 2 by the comparator 401. If the luminance signal Y is less than threshold value 1, a low luminance count signal is output. If luminance signal Y is between threshold values 1 and 2, a middle luminance count signal is output. If luminance signal Y is greater than threshold value 2, a high luminance count signal is output. The counters 402, 403, and 404 count these low, middle, and high luminance count signals as each pixel in one field of the effective screen area is evaluated, and then respectively output the low, middle, and high luminance pixel counts.

The operation of the image evaluation means 108 is described in detail below with reference to FIG. 5B.

Quantization tables addressed by the low, middle, and high luminance pixel counts supplied from the feature quantity extraction circuit 107 are stored in the quantization table 501 for normally illuminated subjects, backlit subjects, and dark subjects. Compensation rates for normally illuminated subjects, backlit subjects, and dark subjects are stored to the output table 502, which is addressed by quantized data input from the quantization table 501. These compensation rates have been determined from experience, and are described in detail in the previous specifications cited above. Thus, when the low, middle, and high luminance pixel counts supplied from the feature quantity extraction circuit 107 are input to the image evaluation means 108, the image evaluation means 108 selects one compensation rate for the input image. By thus using a two-stage table look-up in the image evaluation means 108, table size can be reduced. To maintain continuity between this compensation rate and the previous field or frame, a filtering process is applied by the filter 503 before outputting the compensation rate.

The operation of the gradation compensation suppression circuit 109 is described in detail below with reference to FIG. 7 and FIG. 8.

The AGC control signal is input from the AGC control circuit 106 to the gradation compensation suppression circuit 109. The gradation compensation suppression characteristic converter 601 then converts the AGC control signal to a suppression value corresponding to the AGC control signal. The converted suppression value is then added to the compensation rate input from the image evaluation means 108 by the adder 602 to generate and output the compensation coefficient. As shown by the gradation compensation suppression characteristic in FIG. 8, the suppression value is low when the AGC control signal is low, and the suppression value increases as the AGC control signal level increases. This means that gradation compensation suppression increases as the AGC gain increases, and gradation compensation can be accomplished without conspicuous noise by linking gradation compensation to the automatic gain control process.

The operation of the gradation compensation circuit 110 is described in detail next with reference to FIG. 9A. First, the Y matrix circuit 801 calculates the luminance signal Y using the input RGB signals, and supplies the resulting luminance signal Y to the L1 gain generator 802 and L2 gain generator 803.

The L1 gain generator 802 generates and outputs a first compensation gain (L1/Y) from the provided luminance signal Y and the curve L1 compensated by a first gradation compensation characteristic. The L2 gain generator 803 likewise outputs a second compensation gain (L2/Y). The average luminance detecting LPF 804 obtains the average luminance Ya from the luminance signal Y. The adder 805 then adds the average luminance Ya to the compensation coefficient φ times 64 to obtain signal M. The weighted-average circuit 806 then applies equation 2' to obtain and output the weighted average compensation gain (Y'/Y) using the first compensation gain (L1/Y), second compensation gain (L2/Y), and signal M.

$$(Y'/Y) = \{(L1/Y)*(255-M)+(L2/Y)*M\}/255 \quad (2')$$

In this embodiment the first compensation gain (L1/Y) is obtained from equation 3', and the second compensation gain (L2/Y) is obtained from equation 4'.

$$(L1/Y) = \{1/255^2 * (Y-255)^3 + 255\}/Y \quad (3')$$

$$(L2/Y) = Y/Y \quad (4')$$

FIG. 10 is a graph of the gradation compensation characteristic in the present embodiment of the invention. In FIG. 10 curve L1 is the first gradation compensation characteristic and curve L2 is the second gradation compensation characteristic. When the compensation coefficient φ is 0, for example, curve a is obtained for the gradation compensation characteristic based on equation 2'. When the compensation coefficient φ is positive, the gradation compensation characteristic is curve c. When the compensation coefficient φ is negative, the gradation compensation characteristic is curve b. By thus varying the compensation coefficient φ it is possible to easily vary the gradation compensation characteristic continuously. If the compensation coefficient of the gradation compensation characteristic is thus varied, the compensation gain of low and middle luminance areas increases gradually, and the overall compensation gain is thus ultimately increased.

Normally illuminated subjects are thus gradation compensated using the gradation compensation characteristic of curve L2 in FIG. 10, backlit subjects are compensated using the gradation compensation characteristic of curve a, and dark subjects are compensated using the gradation compensation characteristic of curve L1. As a result, gradation compensation achieving rich image gradation can be accomplished with all subject types.

FIG. 11 is a graph of the gradation compensation characteristic and input/output characteristic in a preferred embodiment of the invention. The imaging apparatus of the invention can accomplish gradation compensation preserving contrast even when the compensation gain slope is low, and thereby achieve an output signal with rich gradation, by using gradation compensation characteristic a in FIG. 11 when the average luminance Ya obtained by the average luminance detecting LPF 804 is equal to the luminance signal Y of the target pixel, gradation compensation characteristic b when the average luminance Ya is less than the luminance signal Y of the target pixel, and gradation compensation characteristic c when the average luminance Ya is greater than the luminance signal Y of the target pixel.

By thus comprising an imaging element 101, a process circuit 102 comprising a gamma correction circuit and white balance circuit, an AGC means 103, an A/D converter 104 for A/D converting the image signal output of the AGC means 103, an integration circuit 105, an AGC control circuit 106 for generating a signal controlling the gain of the AGC means 103, a feature quantity extraction circuit 107 for extracting the feature quantities of the image signal, an image evaluation means 108 for evaluating the backlighting and strong normal lighting of the input image, a gradation compensation suppression circuit 109 for setting the gradation compensation coefficient based on the output from the AGC control circuit 106 and the output from the image evaluation means 108, a gradation compensation circuit 110 for gradation compensating the output from the A/D converter 104 using the supplied gradation compensation coefficient, a signal processing circuit 111 for signal processing the gradation-compensated image signal input from the gradation compensation circuit 110, and a D/A converter 112 for D/A converting the image signal output of the signal processing circuit 111, the imaging apparatus of the invention can link the gradation compensation operation to the AGC control signal. As a result, an output image with rich gradation across the entire luminance range can be achieved with good color balance using subjects ranging from backlit to normally illuminated subjects without conspicuous noise or gradation loss.

Furthermore, by comprising a Y matrix circuit 801, L1 gain generator 802, L2 gain generator 803, average luminance detecting LPF 804, adder 805, weighted-average circuit 806, delay circuits 807, and multipliers 808, the gradation compensation circuit 110 can generate the compensation gain levels according to the compensation coefficient. It is therefore not necessary to provide extra ROM for storing plural gradation compensation characteristics, and the circuit scale can be greatly reduced.

Furthermore, because gradation compensation characteristics can be generated for normal and backlit subjects by changing the compensation coefficient φ, an output image with rich gradation across the entire luminance range can be achieved with good color balance using subjects ranging from backlit to normally illuminated subjects without gradation loss.

In addition, because the gradation compensation characteristic can be varied continuously, natural gradation compensation of moving pictures can also be accomplished.

Furthermore, when the input signal level is high, it is possible to clearly reproduce even high luminance areas where gradation is normally lost with the conventional auto knee control method by applying gradation compensation whereby the input signal is output substantially without change.

Embodiment 3

Figure 12:
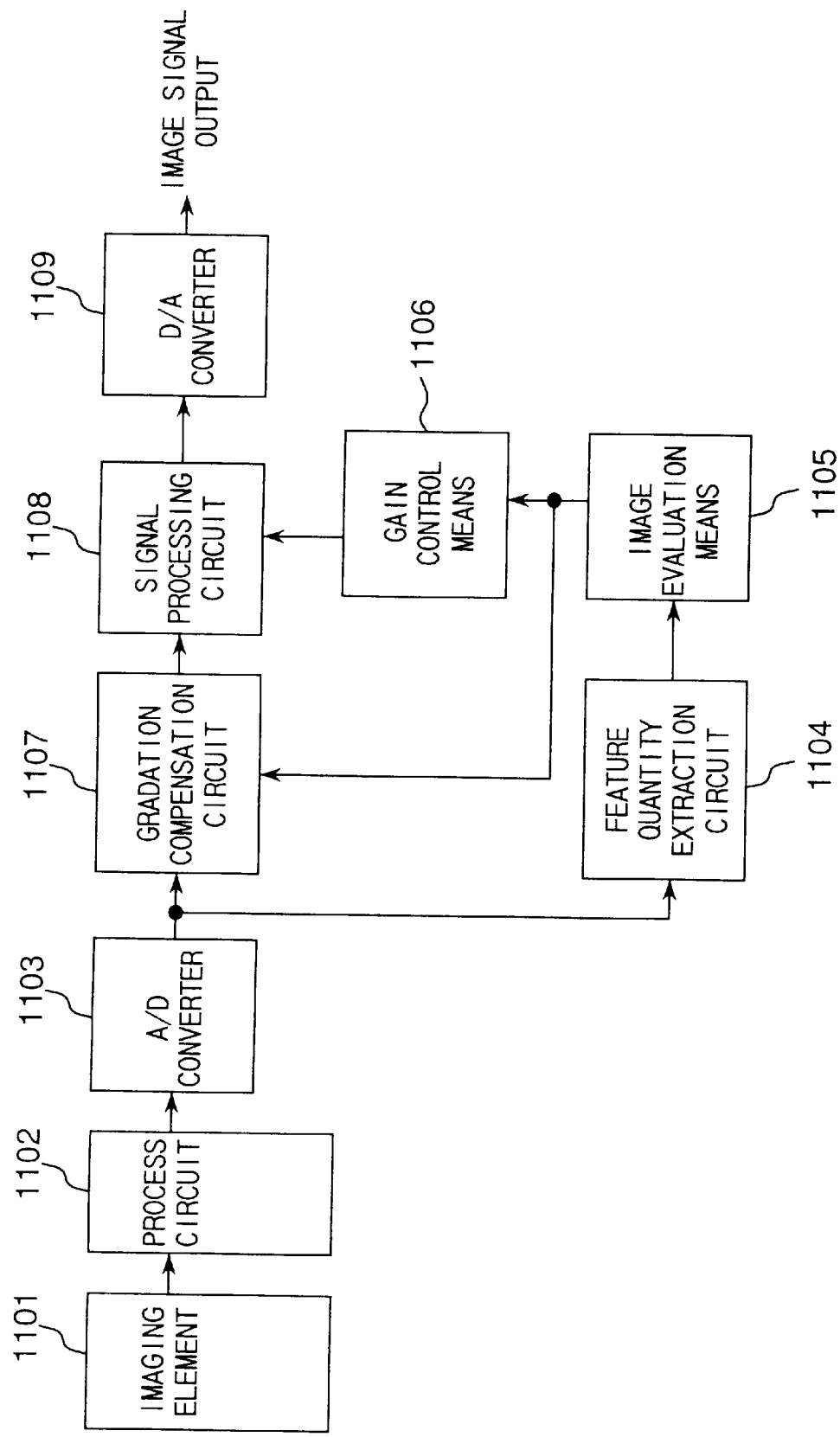
FIG. 12 is a block diagram of an imaging apparatus according to a third embodiment of the invention.

FIG. 12 is a block diagram of an imaging apparatus according to a third embodiment of the invention.

As shown in FIG. 12 the imaging apparatus of the third embodiment comprises an imaging element 1101, a process circuit 1102 comprising such as a gamma correction circuit and white balance circuit, an A/D converter 1103 for A/D converting the image signal output of the process circuit 1102, a feature quantity extraction circuit 1104 for extracting the feature quantities of the image signal, an image evaluation means 1105 for evaluating the backlighting and strong normal lighting of the input image, a DTL gain control means 1106 for determining the DTL gain based on the image evaluation result, a gradation compensation circuit 1107 for gradation compensating the output from the A/D converter 1103 using the gradation compensation coefficient, a signal processing circuit 1108 for applying such as detail compensation signal processing to the gradation-compensated image signal input from the gradation compensation circuit 1107, and a D/A converter 1109 for D/A converting the image signal output of the signal processing circuit 1108.

Figure 13:
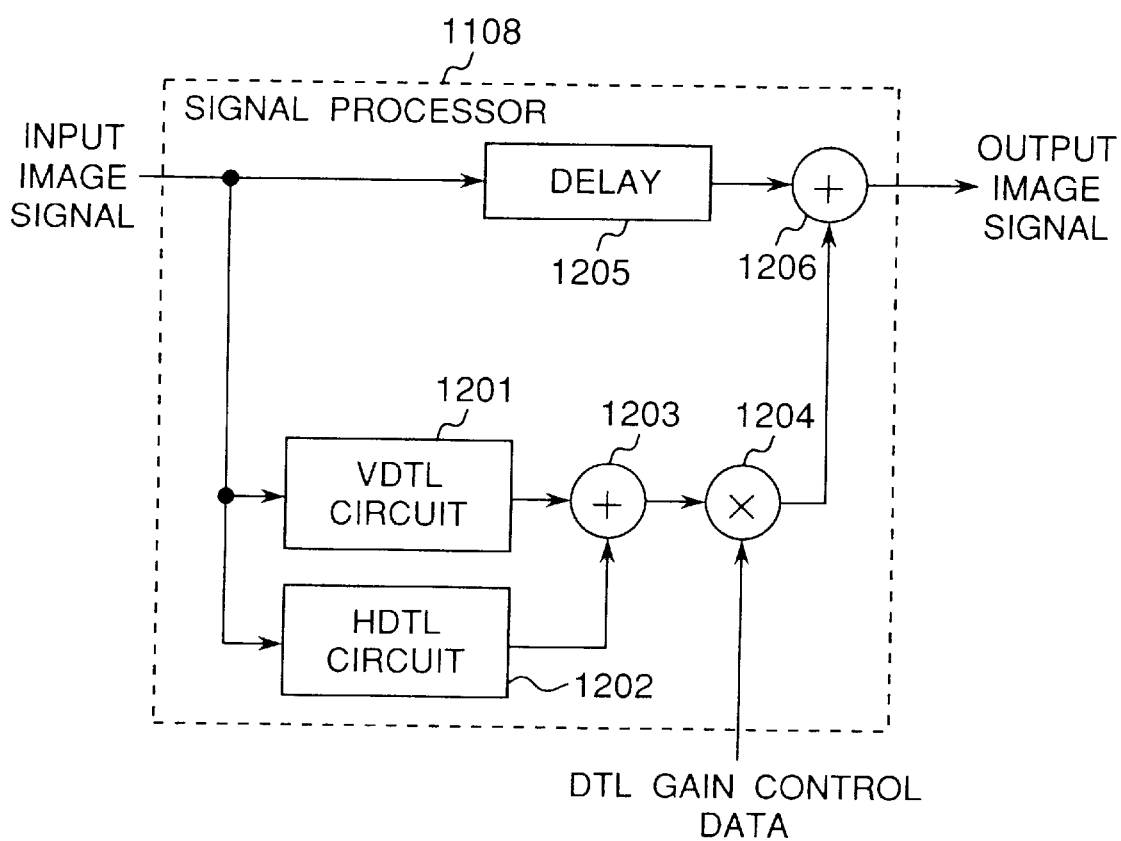
FIG. 13 is a block diagram of the signal processing circuit shown in FIG. 12.

FIG. 13 is a block diagram of the signal processing circuit 1108 shown in FIG. 12 according to this third embodiment. The signal processing circuit 1108 comprises a vertical detail circuit 1201, horizontal detail circuit 1202, adder 1203, multiplier 1204, delay circuit 1205, and adder 1206

Figure 14:
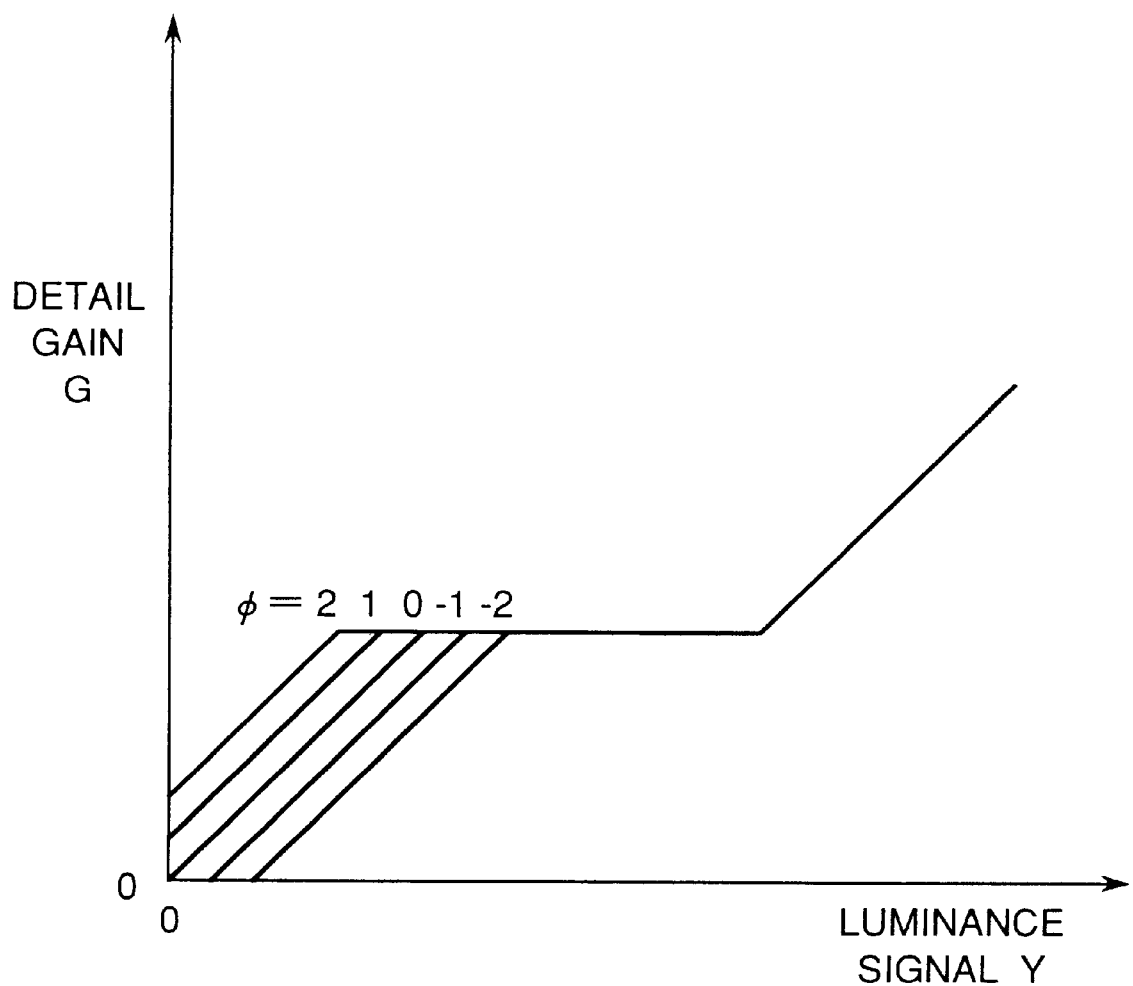
FIG. 14 is a graph of detail control in the third embodiment of the invention.

FIG. 14 is a graph of detail control based on the luminance signal Y in the third embodiment of the invention.

Figure 9B:
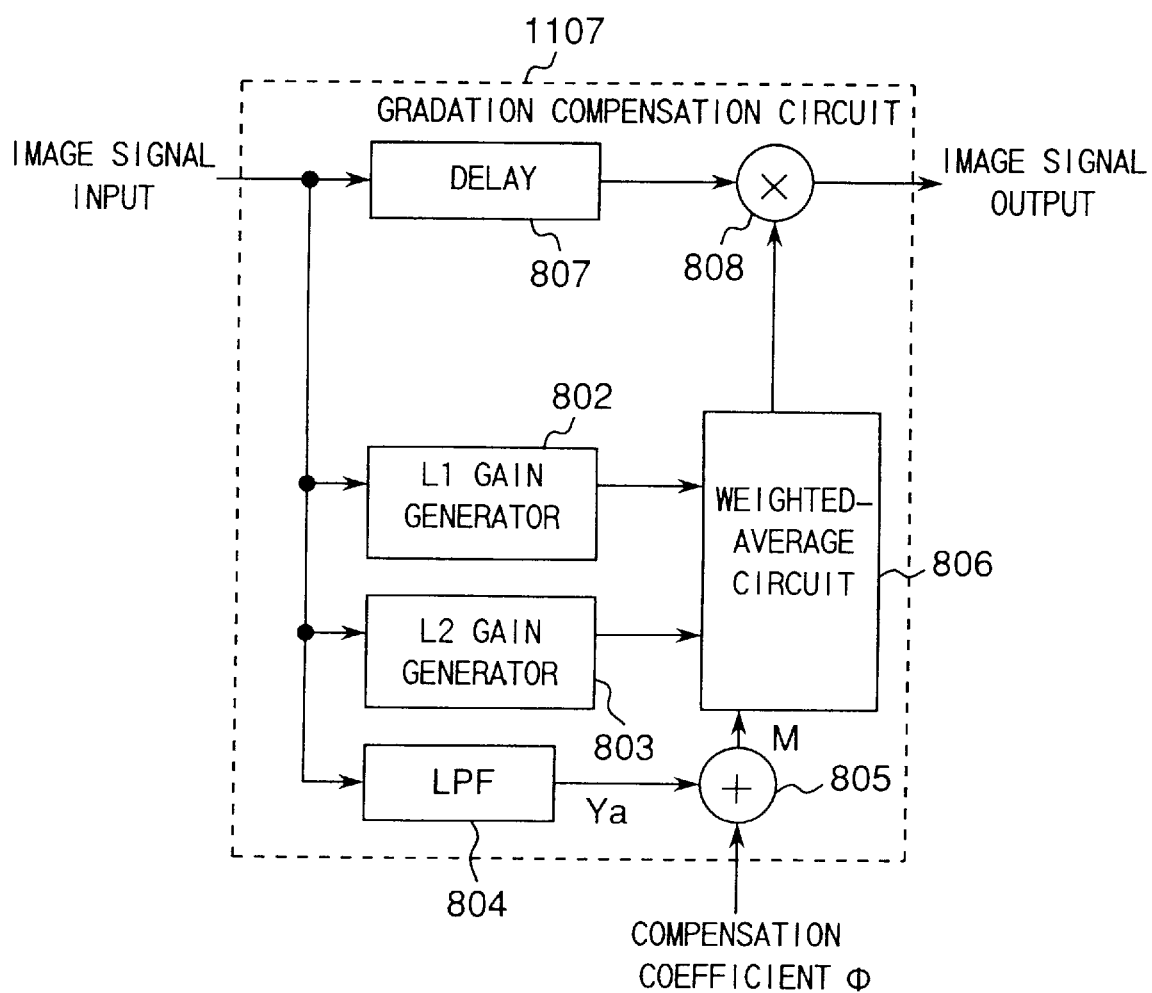
FIG. 9B is a block diagram of the gradation compensation circuit in the third and fourth embodiments of the invention.

FIG. 9B is a block diagram of the gradation compensation circuit 1107 in the third embodiment of the invention. As shown in FIG. 9B the gradation compensation circuit 1107 comprises a L1 gain generator 802, L2 gain generator 803, average luminance detecting circuit (LPF) 804, adder 805, weighted-average circuit 806, delay circuit 807, and multiplier 808.

The operation of an imaging apparatus according to the third embodiment of the invention thus comprised is described below. The image signal generated by the imaging element 1101 is first processed by the process circuit 1102 for gamma correction, white balance control, and other operations as needed, and is then input to the A/D converter 1103. The image signal from the process circuit 1102 is then converted to a digital signal by the A/D converter 1103. The image signal converted to a 256-level (0–255) digital signal by the A/D converter 1103 is then input to the gradation compensation circuit 1107 and the feature quantity extraction circuit 1104.

The operations of the feature quantity extraction circuit 1104 and the image evaluation means 1105 are identical to the operation of those means in the second embodiment above. Specifically, the feature quantity extraction circuit 1104 obtains the luminance histogram of the image signal, and the image evaluation means 1105 sets the compensation coefficient of the gradation compensation characteristic to be used for compensating the image signal based on the luminance histogram extracted by the feature quantity extraction circuit 1104.

The gradation compensation circuit 1107 then obtains the luminance signal Y' after compensation from the luminance signal Y and compensation coefficient, calculates the compensation gain (Y'/Y), and adjusts the timing of the input image signal and the compensation gain of the delay circuit 807. The multiplier 808 then multiplies the delayed image signal with the compensation gain (Y'/Y) to output the gradation-compensated output image signal with rich gradation across the entire luminance range.

Using the compensation coefficient set by the image evaluation means 1105, the DTL gain control means 1106 then reduces the detail gain in low luminance areas, and outputs a detail gain level corresponding to the luminance signal Y. The gradation-compensated image signal is also input from the gradation compensation circuit 1107 to the signal processing circuit 1108, which applies detail compensation signal processing based on the detail gain level set by the DTL gain control means 1106.

By thus linking gradation compensation with detail compensation, gradation compensation without conspicuous noise in low luminance areas can be accomplished.

The D/A converter 1109 then re-converts the image signal to an analog output image signal.

The operation of the DTL gain control means 1106 and signal processing circuit 1108 of this embodiment are described in detail below with reference to FIG. 13 and FIG. 14.

The DTL gain control means 1106 has detail gain characteristics corresponding to the luminance signal Y as shown in FIG. 14. Specifically, these characteristics reduce the detail gain in low luminance areas and increase the detail gain in high luminance areas. This is to reduce deterioration of the S/N ratio in low luminance areas, and to compensate for loss of detail resulting from gamma correction in high luminance areas.

The gradation compensation circuit 1107 of the present embodiment accomplished gradation compensation by using a higher gain level in low luminance areas than in high luminance areas, thus resulting in S/N ratio degradation in low luminance areas. By reducing the low luminance area detail gain in relation to the compensation coefficient set by the integration circuit 105, however, it is possible to make the S/N ratio loss in low luminance areas inconspicuous.

For example, if the compensation coefficient φ=2, edge components in dark areas will be emphasized using the detail gain G of the low luminance areas as a reference. If the compensation coefficient φ=0, however, the subject is backlit and the image contains both dark and light areas. Gradation compensation by the gradation compensation circuit 1107 thus works to increase gradation in dark areas, but this also enhances noise. To prevent this in such cases the detail gain G is reduced for dark, low luminance areas, thus suppressing edge enhancement and preventing noise from being emphasized. If the compensation coefficient φ=−2, the image is dark overall. The detail gain C for dark, low luminance areas is therefore reduced even more so that there is virtually no emphasis.

FIG. 13 is a block diagram of the signal processing circuit 1108. The input image signal is supplied to the delay circuit 1205 as well as the vertical detail circuit 1201 and the horizontal detail circuit 1202. The vertical detail circuit 1201 applies a high pass filtering process in the vertical direction to output a vertical detail signal, and the horizontal detail circuit 1202 applies a high pass filtering process in the horizontal direction to output a horizontal detail signal. The horizontal and vertical detail signals are then combined by the adder 1203 to produce the detail signal.

This detail signal is then multiplied by the multiplier 1204 with the detail gain input from the DTL gain control means 1106 to adjust the detail level. The detail signal is then added by the adder 1206 with the input image signal delayed for timing control by the delay circuit 1205 to output the detail-compensated image signal.

By thus reducing the detail gain in low luminance areas in relation to the compensation coefficient set by the image evaluation means 1105, it is possible to prevent S/N ratio degradation in low luminance areas from being conspicuous.

By thus comprising an imaging element 1101, a process circuit 1102 comprising a gamma correction circuit and white balance circuit, an A/D converter 1103 for A/D converting the image signal output of the process circuit 1102, a feature quantity extraction circuit 1104 for extracting the feature quantities of the image signal, an image evaluation means 1105 for evaluating the backlighting and strong normal lighting of the input image, a DTL gain control means 1106 for determining the DTL gain based on the image evaluation result, a gradation compensation circuit 1107 for gradation compensating the output from the A/D converter 1103 using the gradation compensation coefficient, a signal processing circuit 1108 for applying such as detail compensation signal processing to the gradation-compensated image signal input from the gradation compensation circuit 1107, and a D/A converter 1109 for D/A converting the image signal output of the signal processing circuit 1108, the imaging apparatus of the present embodiment can generate the compensation gain levels according to the compensation coefficient. It is therefore not necessary to provide extra ROM for storing plural gradation compensation characteristics, and the circuit scale can be greatly reduced.

Furthermore, because gradation compensation characteristics can be generated for normal and backlit subjects by changing the compensation coefficient φ, an output image with rich gradation across the entire luminance range can be achieved with good color balance using subjects ranging from backlit to normally illuminated subjects without gradation loss.

In addition, because the detail gain in low luminance areas is controlled according to the compensation coefficient, gradation compensation without conspicuous noise is possible.

Furthermore, when the input signal level is high, it is possible to clearly reproduce even high luminance areas where gradation is normally lost with the conventional auto knee control method by applying gradation compensation whereby the input signal is output substantially without change.

Moreover, the imaging apparatus of the invention can accomplish gradation compensation preserving contrast and achieving rich gradation in the output signal even when the slope of compensation gain is low by appropriately varying the gradation compensation characteristic on a pixel unit level based on the average luminance value Ya for gradation compensation.

Embodiment 4

Figure 15:
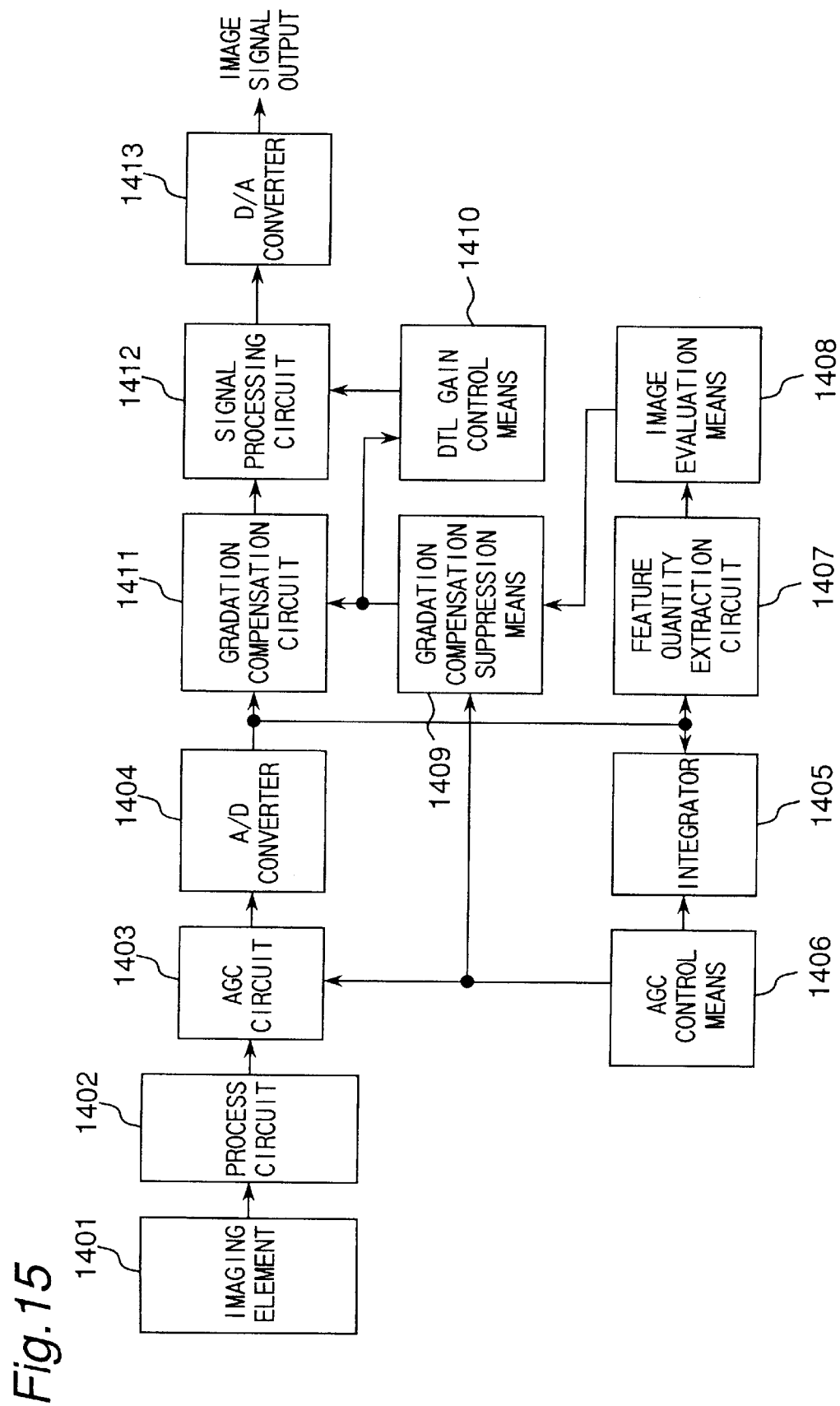
FIG. 15 is a block diagram of an imaging apparatus according to a fourth embodiment of the invention.

FIG. 15 is a block diagram of an imaging apparatus according to a fourth embodiment of the invention.

As shown in FIG. 15 the imaging apparatus of the fourth embodiment comprises an imaging element 1401, a process circuit 1402 comprising a gamma correction circuit and white balance circuit, an AGC means 1403, an A/D converter 1404 for A/D converting the image signal output of the AGC means 1403, an integration circuit 1405, an AGC control circuit 1406 for generating a signal controlling the gain of the AGC means 1403, a feature quantity extraction circuit 1407 for extracting the feature quantities of the image signal, an image evaluation means 1408 for evaluating the backlighting and strong normal lighting of the input image, a gradation compensation suppression circuit 1409 for setting the gradation compensation coefficient based on the output from the AGC control circuit 1406 and the output from the image evaluation means 1408, a DTL gain control means 1410 for determining the DTL gain based on the compensation coefficient set by the gradation compensation suppression circuit 1409, a gradation compensation circuit 1411 for gradation compensating the output from the A/D converter 1404 using the supplied gradation compensation coefficient, a signal processing circuit 1412 for signal processing the gradation-compensated image signal input from the gradation compensation circuit 1411, and a D/A converter 1413 for D/A converting the image signal output of the signal processing circuit 1412.

The operation of an imaging apparatus according to the fourth embodiment of the invention thus comprised is described below.

The image signal generated by the imaging element 1401 is first processed by the process circuit 1402 for gamma correction, white balance control, and other operations as needed, and is then input to the AGC means 1403. The image signal from the AGC means 1403 is then converted to a digital signal by the A/D converter 1404.

The output signal of the A/D converter 1404 is input to the integration circuit 1405, which is constructed identically to the integration circuit 105 shown in FIG. 6A.

The full-screen averaging circuit 105a of the integration circuit 105 calculates the average luminance of the overall screen (image) from the output signal of the A/D converter 1404. At the same time the center-weighted averaging circuit 105b calculates the average in the middle of the screen, and then multiplies this average by a weight (for example, a multiplier of 2) to obtain the center-weighted average of the image. The screen average and the center-weighted average are then added by the adder 105c, and this average sum signal is then normalized to the output level range of the AGC means 1403 by the normalization circuit 105d, obtaining the integrated value that is then output to the AGC control circuit 1406.

The AGC control circuit 1406 is also constructed identically to the AGC control circuit 106 shown in FIG. 6A.

The comparator 106a of the AGC control circuit 1406 compares this integrated value with a reference value, and the AGC control signal output circuit 106b then generates the AGC control signal whereby the output signal level of the AGC means 1403 is controlled to a constant level.

More specifically, as shown by the output characteristics of the AGC control signal in FIG. 6B, if the integrated value is less than the reference value, the AGC control signal is generated and output to increase the gain so that the integrated value and the reference value are equal. The output signal level of the AGC means 1403 is thus controlled to a constant level.

The A/D converter 1404 converts the image signal from the AGC means 1403 to 256-level digital signals comprising levels 0–255, and outputs the digitized image signal to the integration circuit 1405, the feature quantity extraction circuit 1407, and the gradation compensation circuit 1411.

The operations of the feature quantity extraction circuit 1407 and the image evaluation means 1408 are identical to the operation of those means in the first and third embodiments above. Specifically, the feature quantity extraction circuit 1407 obtains the luminance histogram of the image signal, and the image evaluation means 1408 sets the compensation coefficient of the gradation compensation characteristic to be used for compensating the image signal based on the luminance histogram.

The gradation compensation suppression circuit 1409 then suppresses the compensation rate according to the AGC control signal of the AGC control circuit 1406, and sets the gradation compensation coefficient.

The gradation compensation circuit 1411 then obtains the gradation-compensated luminance signal Y' from the luminance signal Y and gradation compensation coefficient, calculates the compensation gain (Y'/Y), adjusts the timing of the input image signal to the compensation gain using the delay circuits 807, multiplies the delayed signals by the compensation gain (Y'/Y) using the multipliers 808, and thus outputs a gradation-compensated image signal with good color balance and rich overall gradation.

By thus linking gradation compensation to the automatic gain control process, gradation compensation can be accomplished without conspicuous noise in low luminance areas.

Using the compensation coefficient $\phi$ set by the gradation compensation suppression circuit 1409, the DTL gain control means 1410 then controls the gain to reduce the detail gain in low luminance areas, and outputs a detail gain level corresponding to the luminance signal Y. The gradation-compensated image signal is also input from the gradation compensation circuit 1411 to the signal processing circuit 1412, which applies detail compensation signal processing based on the detail gain level set by the DTL gain control means 1410.

By thus linking gradation compensation with detail compensation, gradation compensation without conspicuous noise in low luminance areas can be accomplished.

The D/A converter 1413 then re-converts the image signal to an analog output image signal.

By thus comprising an imaging element 1401, a process circuit 1402 comprising a gamma correction circuit and white balance circuit, an AGC means 1403, an A/D converter 1404 for A/D converting the image signal output of the AGC means 1403, an integration circuit 1405, an AGC control circuit 1406 for generating a signal controlling the gain of the AGC means 1403, a feature quantity extraction circuit 1407 for extracting the feature quantities of the image signal, an image evaluation means 1408 for evaluating the backlighting and strong normal lighting of the input image, a gradation compensation suppression circuit 1409 for setting the gradation compensation coefficient based on the output from the AGC control circuit 1406 and the output from the image evaluation means 1408, a DTL gain control means 1410 for determining the DTL gain based on the compensation coefficient set by the gradation compensation suppression circuit 1409, a gradation compensation circuit 1411 for gradation compensating the output from the A/D converter 1404 using the supplied gradation compensation coefficient, a signal processing circuit 1412 for signal processing the gradation-compensated image signal input from the gradation compensation circuit 1411, and a D/A converter 1413 for D/A converting the image signal output of the signal processing circuit 1412, the imaging apparatus of the present embodiment can generate the compensation gain levels according to the compensation coefficient. It is therefore not necessary to provide extra ROM for storing plural gradation compensation characteristics, and the circuit scale can be greatly reduced.

Furthermore, because gradation compensation characteristics can be generated for normal and backlit subjects by changing the compensation coefficient, an output image with rich gradation across the entire luminance range can be achieved with good color balance using subjects ranging from backlit to normally illuminated subjects without gradation loss.

In addition, because gradation compensation is regulated by an AGC control signal and the detail gain in low luminance areas is controlled according to the compensation coefficient, gradation compensation without conspicuous noise is possible.

Furthermore, when the input signal level is high, it is possible to clearly reproduce even high luminance areas where gradation is normally lost with the conventional auto knee control method by applying gradation compensation whereby the input signal is output substantially without change.

Moreover, the imaging apparatus of the invention can accomplish gradation compensation preserving contrast and achieving rich gradation in the output signal even when the slope of compensation gain is low by appropriately varying the gradation compensation characteristic on a pixel unit level based on the average luminance Ya value for gradation compensation.

It should be noted that while a luminance signal Y and RGB signals have been used by way of example for the input image signals in the preceding embodiments, the same effects can be achieved by using in place of the luminance signal Y and RGB signals a luminance signal and color difference signals, a composite signal, or a signal mixing a chrominance signal with the luminance signal.

It should be further noted that the gradation compensation means of the above embodiments multiply a compensation gain coefficient with each of the input image signals to effect gradation compensation. However, the same effect can be achieved by using the compensation value (Y'–Y) in place of the compensation gain coefficient (Y'/Y) and adding this compensation value to the input image signals.

It should be further noted that while the above embodiments have been described converting the analog input image signal to an 8-bit digital signal, the invention shall not be limited to this quantization rate and other quantization rates can be used insofar as the bit rate processed by the compensation gain generator and other components matches the quantization rate.

It should be further noted that the feature quantity extraction circuits of the above embodiments have been described outputting pixel counts for three luminance levels. The threshold values demarcating these luminance levels shall not be limited to those described above, however. Other threshold values can specifically be used, and the number of luminance levels shall also not be limited to three.

It should be further noted that the above embodiments have been described with the feature quantity extraction circuit counting the pixels in an effective screen area measuring 240 scan lines high by 320 pixels per horizontal scan line. The number of pixels counted shall not be so limited, however, and the number of signal bits representing one pixel can be any number of bits whereby the features of the input image can be known.

It should be further noted that the above embodiments have been described with the compensation coefficient setting circuit evaluating the input image using a luminance histogram as the feature quantity, but the invention shall not be so limited and other feature quantities can be used in place of the luminance histogram. For example, histograms of the combined RGB signal or any one of the RGB signals can be used, or the effective screen area of the image data can be segmented into blocks, and the luminance signal, RGB signals, or maximum, average, or minimum color difference signals of each block can be used for the corresponding feature quantity. The invention shall not be limited to these feature quantities, and any feature quantity whereby the image can be segmented into identifiable classes can be used.

The compensation coefficient setting circuit of the invention shall also not be limited to any single type or method, and can be achieved using a neural network, fuzzy logic control, template matching, or other method whereby the image can be evaluated and the gradation compensation characteristics determined.

By thus comprising an imaging element, an AGC means, an AGC control circuit for generating a signal controlling the gain of the AGC means, a feature quantity extraction circuit for extracting the feature quantities of the image signal, an image evaluation means for evaluating the backlighting and strong normal lighting of the input image, a gradation compensation suppression circuit for setting the gradation compensation coefficient based on the output from the AGC control circuit and the output from the image evaluation means, a DTL gain control means for determining the DTL gain based on the gradation compensation coefficient set by the is gradation compensation suppression circuit, a gradation compensation circuit for applying gradation compensation according to a gradation compensation coefficient, and a signal processing circuit for signal processing the image signal gradation-compensated by the gradation compensation circuit, the imaging apparatus of the invention can generate compensation gain levels according to the compensation coefficient. It is therefore not necessary to provide extra ROM for storing plural gradation compensation characteristics, and the circuit scale can be greatly reduced.

Furthermore, because gradation compensation characteristics can be generated for normal and backlit subjects by changing the compensation coefficient, an output image with rich gradation across the entire image range can be achieved with good color balance using subjects ranging from backlit to normally illuminated subjects without gradation loss.

In addition, because gradation compensation is regulated by an AGC control signal and the detail gain in low luminance areas is controlled according to the compensation coefficient, gradation compensation without conspicuous noise is possible.

Furthermore, when the input signal level is high, it is possible to clearly reproduce even high luminance areas where gradation is normally lost with the conventional auto knee control method by applying gradation compensation whereby the input signal is output substantially without change.

Moreover, the imaging apparatus of the invention can accomplish gradation compensation preserving contrast and achieving rich gradation in the output signal even when the slope of compensation gain is low by appropriately varying the gradation compensation characteristic on a pixel unit level based on the average luminance Ya value for gradation compensation.

Embodiment 5

Figure 16:
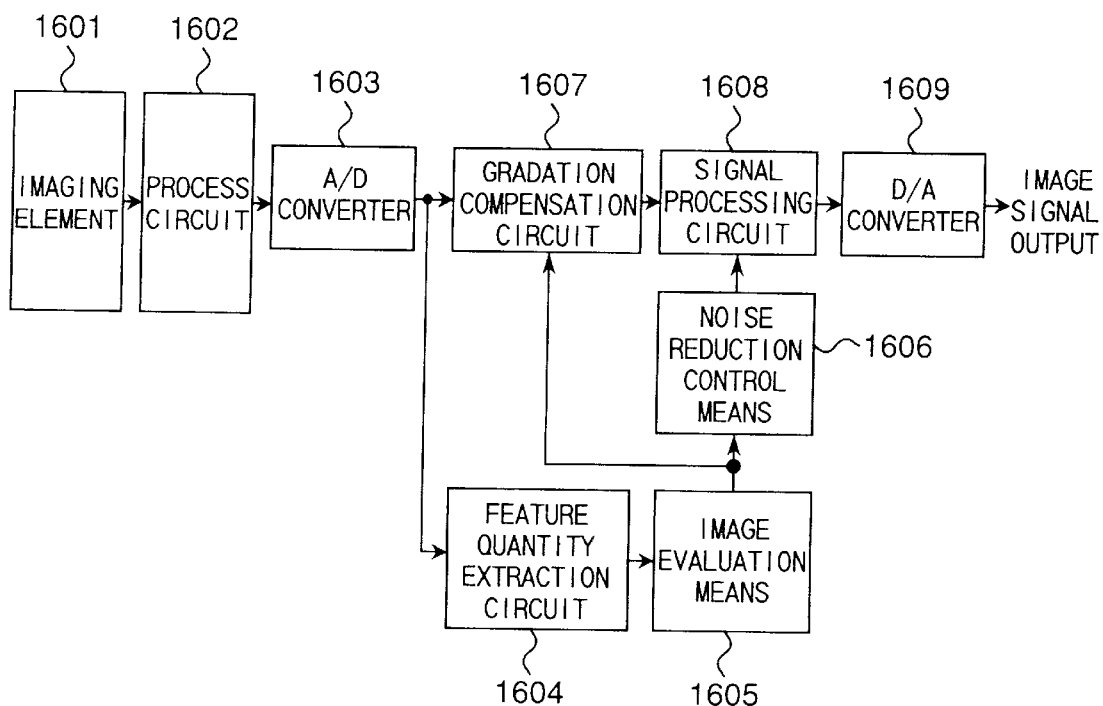
FIG. 16 is a block diagram of an imaging apparatus according to a fifth embodiment of the invention.

FIG. 16 is a block diagram of an imaging apparatus according to a fifth embodiment of the invention.

As shown in FIG. 16 the imaging apparatus of the fifth embodiment comprises an imaging element 1601, a process circuit 1602 comprising a gamma correction circuit and white balance circuit, an A/D converter 1603 for A/D converting the image signal output of the process circuit 1602, a feature quantity extraction circuit 1604 for extracting the feature quantities of the image signal, an image evaluation means 1605 for evaluating the backlighting and strong normal lighting of the input image, a noise reduction control means 1606 for controlling the noise suppression characteristic based on the image evaluation result, a gradation compensation circuit 1607 for gradation compensating the output from the A/D converter 1603 using the gradation compensation coefficient, a signal processing circuit 1608 for applying such as noise reduction signal processing to the gradation-compensated image signal input from the gradation compensation circuit 1607, and a D/A converter 1609 for D/A converting the image signal output of the signal processing circuit 1608.

The imaging apparatus of the fifth embodiment thus comprised operates as follows.

Referring again to FIG. 16, the imaging element 1601, process circuit 1602, A/D converter 1603, feature quantity extraction circuit 1604, image evaluation means 1605, and gradation compensation circuit 1607 operate identically to the corresponding imaging element 1101, process circuit 1102, A/D converter 1103, feature quantity extraction circuit 1104, image evaluation means 1105, and gradation compensation circuit 1107 of the third embodiment above. More specifically, the image evaluation means 1605 evaluates the image captured by the imaging element 1601 for backlighting and strong normal lighting to output a compensation coefficient, and the gradation compensation circuit 1607 then applies gradation compensation based on that compensation coefficient.

When the compensation coefficient output by the image evaluation means 1605 is low, the noise reduction control means 1606 outputs a noise suppression characteristic signal so that the noise suppression characteristic of the signal processing circuit 1608 is increased. The signal processing circuit 1608 then applies noise reduction signal processing according to this suppression characteristic.

By thus linking gradation compensation to noise reduction, gradation compensation in which noise is inconspicuous can be achieved.

The D/A converter 1609 then re-converts the output of the signal processing circuit 1608 to an analog image signal output.

Figure 17:
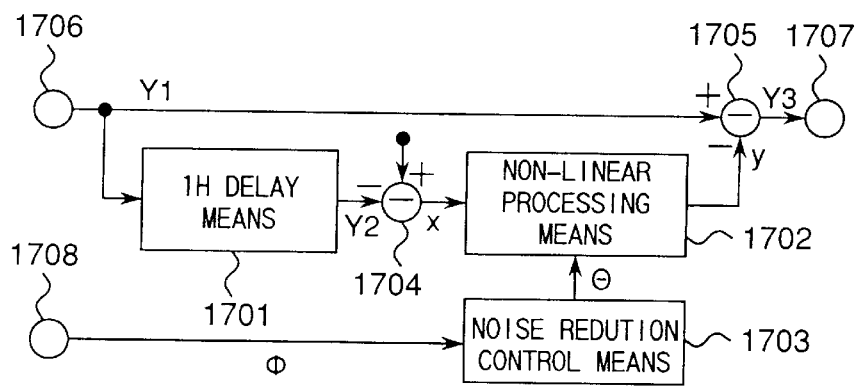
FIG. 17 is a block diagram of the signal processing circuit and noise reduction control circuit shown in FIG. 16.

FIG. 17 is a block diagram of the signal processing circuit 1608 and noise reduction control circuit 1606 shown in FIG. 16 according to the fifth embodiment of the invention. Shown in FIG. 17 are a delay means 1701, a non-linear processor 1702, a non-linear characteristic selector (noise reduction controller IN THE FIGURES) 1703, subtracters 1704 and 1705, an image signal input terminal 1706, an image signal output terminal 1707, and a gradation compensation coefficient input terminal 1708 connected to the image evaluation means 1605.

The delay means 1701 delays the image signal Y1 ((a) in FIG. 18C) input from the image signal input terminal 1706 one line, and outputs delayed signal Y2 ((b) in FIG. 18C). The subtracter 1704 obtains and outputs the difference signal x ((c) in FIG. 18C) from the current image signal Y1 and the image signal Y2 delayed from the previous line.

The non-linear characteristic selector (noise reduction controller) 1703 sets the input/output characteristic of the non-linear processor 1702 according to the gradation compensation coefficient input from the gradation compensation coefficient input terminal 1708. Based on the input/output characteristic set by the noise reduction controller 1703, the non-linear processor 1702 processes the difference signal x from the subtracter 1704 and outputs signal y ((d) in FIG. 18C). The subtracter 1705 obtains and outputs the difference Y3 ((e) in FIG. 18C) between signal y and the image signal Y1 from the image signal input terminal 1706.

Figure 18A:
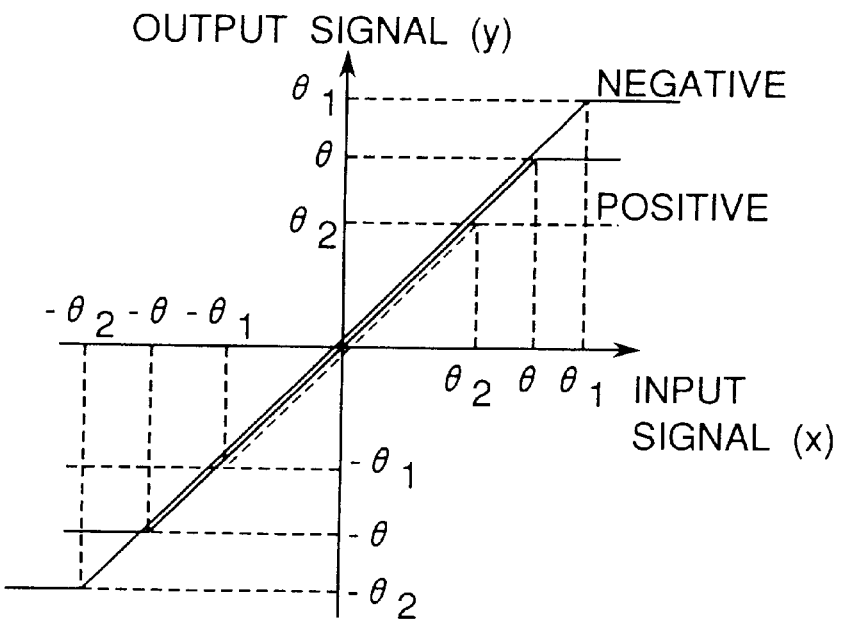
FIG. 18A and FIG. 18B are input/output characteristics diagrams of the noise reduction control circuit in the fifth embodiment of the invention.

FIG. 18A is an input/output characteristics graph of the non-linear processor 1702 in the fifth embodiment of the invention. The input signal x to the non-linear processor 1702 is plotted on the horizontal axis, and the output signal y of the non-linear processor 1702 is plotted on the vertical axis in FIG. 18A. As shown in FIG. 18A, the input/output characteristic of the non-linear processor 1702 is defined by equation 7.

$$\text{When } x < -\theta, \ y = -\theta$$
$$\text{when } -\theta \leq x \leq \theta, \ y = x$$
$$\text{when } x \geq \theta, \ y = \theta \quad (7)$$

The characteristic of equation 7 is set by the noise reduction controller 1703. The noise reduction controller 1703 determines the value of $\phi$ using equation 8 based on the value of the gradation compensation coefficient.

$$\text{When compensation coefficient } \phi < 0, \ \theta = \theta 1$$
$$\text{when compensation coefficient } \phi \geq 0, \ \theta = \theta 2 \quad (8)$$

where $\theta 2 \geq \theta 1$.

In other words, when the gradation compensation coefficient is a negative value, the noise reduction characteristic is enhanced, and when the gradation compensation coefficient is a positive value, the noise reduction characteristic is de-emphasized as shown in FIG. 18A.

Figure 18B:
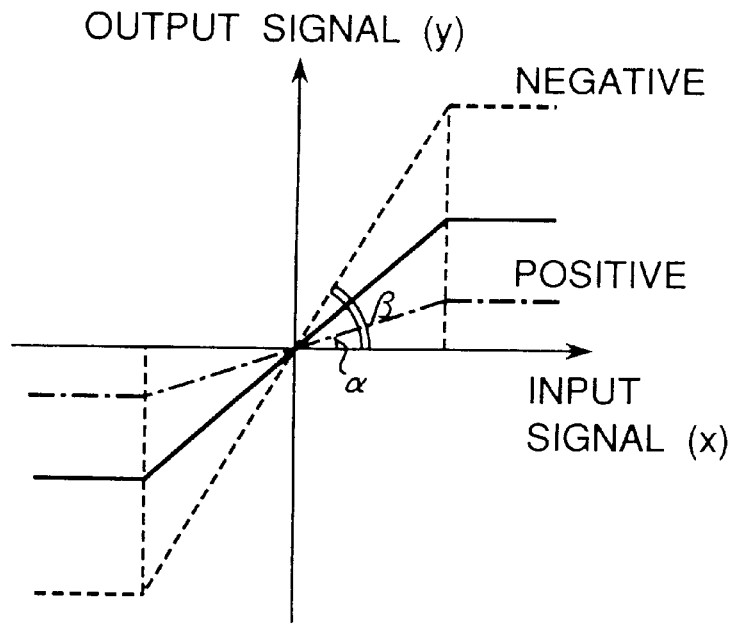

In addition to varying the noise reduction characteristic using the gradation compensation coefficient $\phi$ as shown in FIG. 18A, it is also possible to vary the noise reduction characteristic by changing the slope according to an alternative method as shown in FIG. 18B.

As described above, the input/output characteristic of the non-linear processor 1702 varies according to equation 8 as shown in FIG. 18A according to the present embodiment. As a result, the noise reduction characteristic is enhanced and gradation compensation in which noise is not conspicuous can be accomplished in images for which the gradation compensation coefficient is negative and the gain of the gradation compensation circuit 1607 is high.

Furthermore, while the delay means 1701 of the present embodiment is a line memory delaying the input signal Y1 one line, the delay means 1701 can alternatively comprise a flip-flop delaying the image signal Y1 one clock or longer, or a field memory delaying the input signal one field or more.

Figure 19:
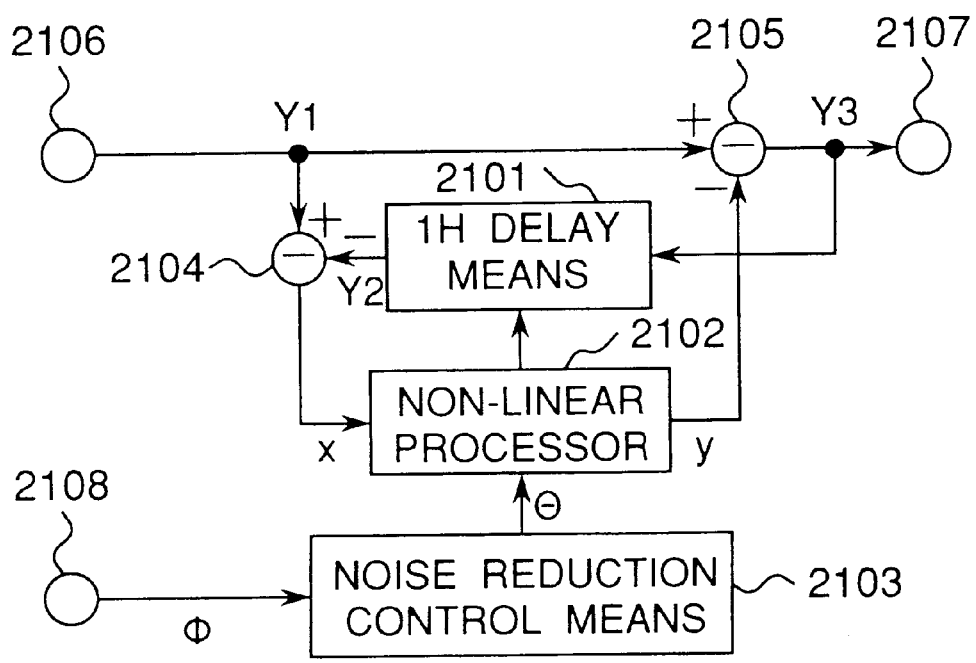
FIG. 19 is a block diagram of alternative embodiments of the signal processing circuit and noise reduction control circuit in the fifth embodiment of the invention.

In addition, the signal processing circuit 1608 of the present embodiment is a feed-forward noise reduction circuit in which a delay means 1701 delays the input signal Y1, but it can also be achieved as a feedback-type noise reduction circuit in which the delay means 1701 delays the output signal Y3. FIG. 19 is a block diagram of a noise reduction control means 1606 and signal processing circuit 1608 comprising a feedback-type noise reduction circuit using the component elements (shown in FIG. 17) of the signal processing circuit 1608 of the embodiment described above. The configuration shown in FIG. 19, however, can achieve a greater noise reduction effect than the above feed-forward design even using a delay means operating at the same delay time.

Figure 20:
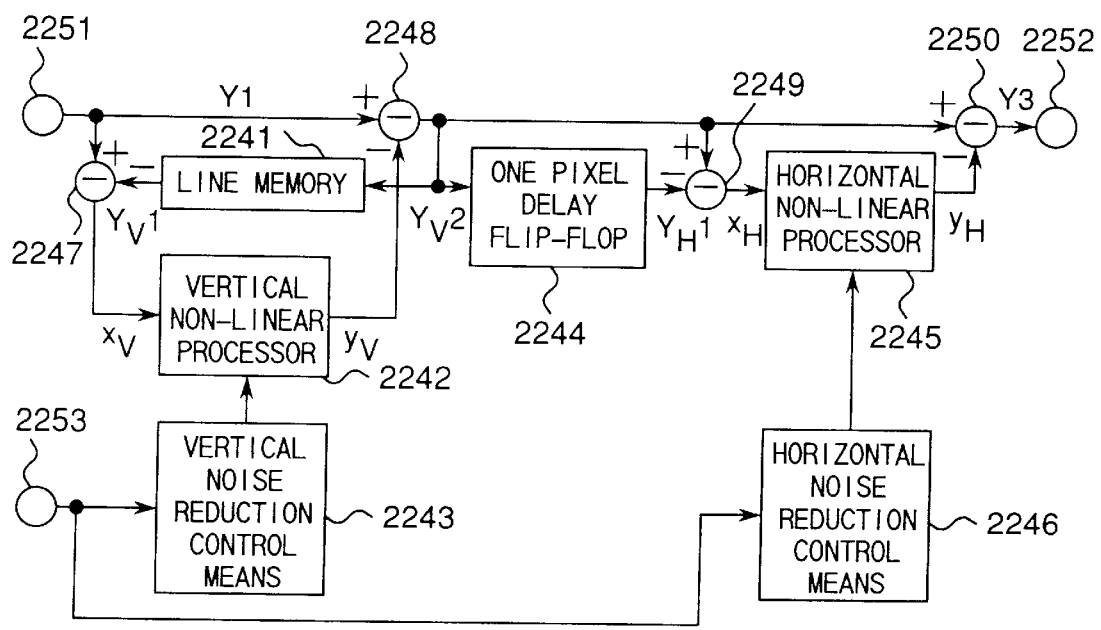
FIG. 20 is a block diagram of further alternative embodiments of the signal processing circuit and noise reduction control circuit in the fifth embodiment of the invention.

Even more efficient noise reduction can also be achieved by connecting noise reduction circuits of the present embodiment in series. FIG. 20 is a block diagram of a noise reduction control means 1606 and signal processing circuit 1608 comprising the noise reduction circuit shown in FIG. 19 and the noise reduction circuit shown in FIG. 17 connected in series.

Referring to FIG. 20 the line memory 2241, vertical non-linear processor 2242, vertical noise reduction control means 2243, and subtracters 2247 and 2248 form a circuit removing the vertical noise component from the image by using a line memory 2241 delaying the signal one line for the delay means 2101 of the signal processing circuit shown in FIG. 19.

In addition, the flip-flop 2244, horizontal non-linear processor 2245, horizontal noise reduction control means 2246, and subtracters 2249 and 2250 form a circuit removing the horizontal noise component from the image by using a flip-flop 2244 delaying the signal one clock period for the delay means 1701 of the signal processing circuit shown in FIG. 17.

Figure 21:
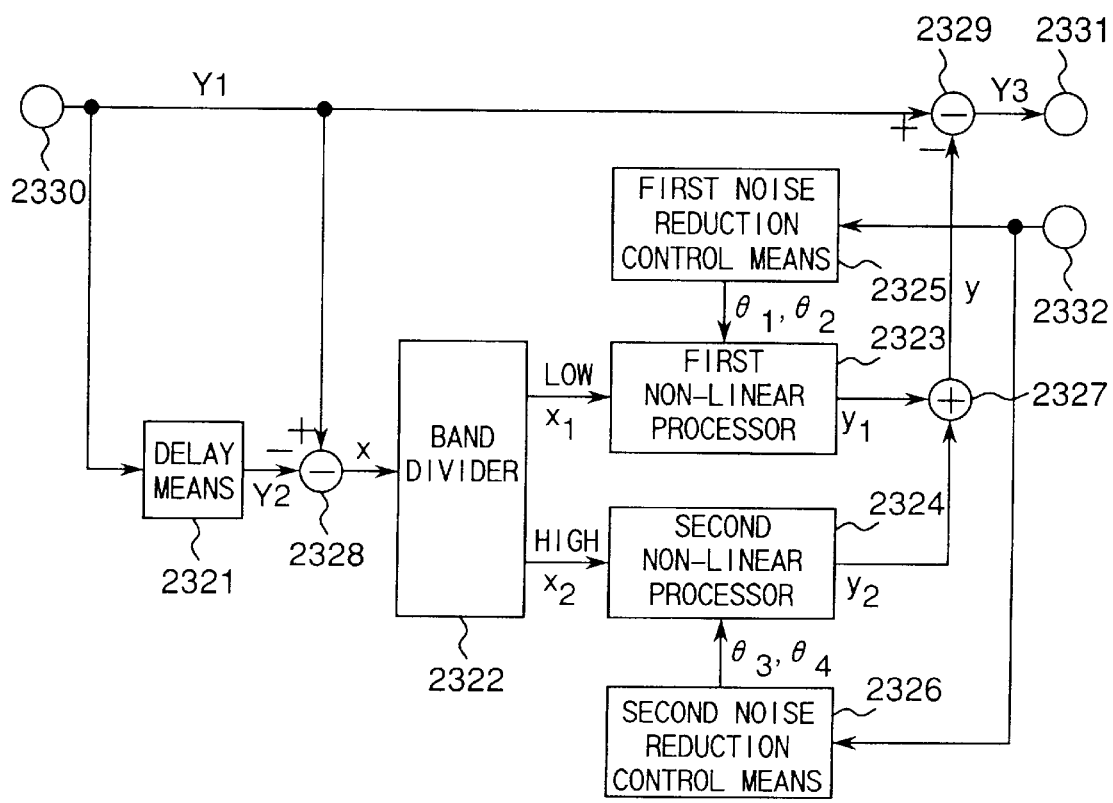
FIG. 21 is a block diagram of yet further alternative embodiments of the signal processing circuit and noise reduction control circuit in the fifth embodiment of the invention.

Furthermore, the signal processing circuit 1608 of this embodiment comprises a noise reduction circuit that uses the difference signal between the input signal Y1 and the output signal Y2 of the delay means 1701. It may be alternatively comprised as a noise reduction circuit that uses the band-divided difference signal of Y2 and Y1. FIG. 21 is a block diagram of this type of signal processing circuit 1608 and noise reduction control means 1606.

As shown in FIG. 21, this configuration comprises a delay means 2321, band divider 2322, first non-linear processor 2323, second non-linear processor 2324, first noise reduction control means 2325, second noise reduction control means 2326, an adder 2327, subtracters 2328 and 2329, an image signal input terminal 2330, image signal output terminal 2331, and gradation compensation coefficient input terminal 2332.

The delay means 2321 delays the input image signal Y1 one line, and outputs delayed signal Y2. The subtracter 2328 subtracts the delayed signal Y2 from the image signal Y1, and outputs difference signal x. The band divider 2322 then divides the difference signal x into low frequency component x1 and high frequency component x2. The first non-linear processor 2323 and the second non-linear processor 2324 apply different signal processing operations (input/output characteristics having different $\theta$ values in FIG. 18) to the respective low and high frequency components x1 and x2, and output y1 and y2.

The first noise reduction control means 2325 determines the value $\theta$ in the input/output characteristic of the first non-linear processor 2323 according to the value of the gradation compensation coefficient. The second noise reduction control means 2326 likewise determines the value $\theta$ in the input/output characteristic of the second non-linear processor 2324 according to the level of the input signal Y1.

The adder 2327 then adds the y1 and y2 output signals of the first and second non-linear processor 2323 and 2324, and outputs signal y. The subtracter 2329 then subtracts signal y from the input signal Y1, and outputs signal Y3.

This operation thus achieves a different noise reduction effect in the high and low frequency components of the difference signal x. For example, if the value of $\theta$ in the input/output characteristic of the second non-linear processor 2324 is greater than the value of θ in the input/output characteristic of the first non-linear processor 2323, a stronger noise reduction effect can be achieved in the high frequency component of the difference signal than in the low frequency component.

Figure 22:
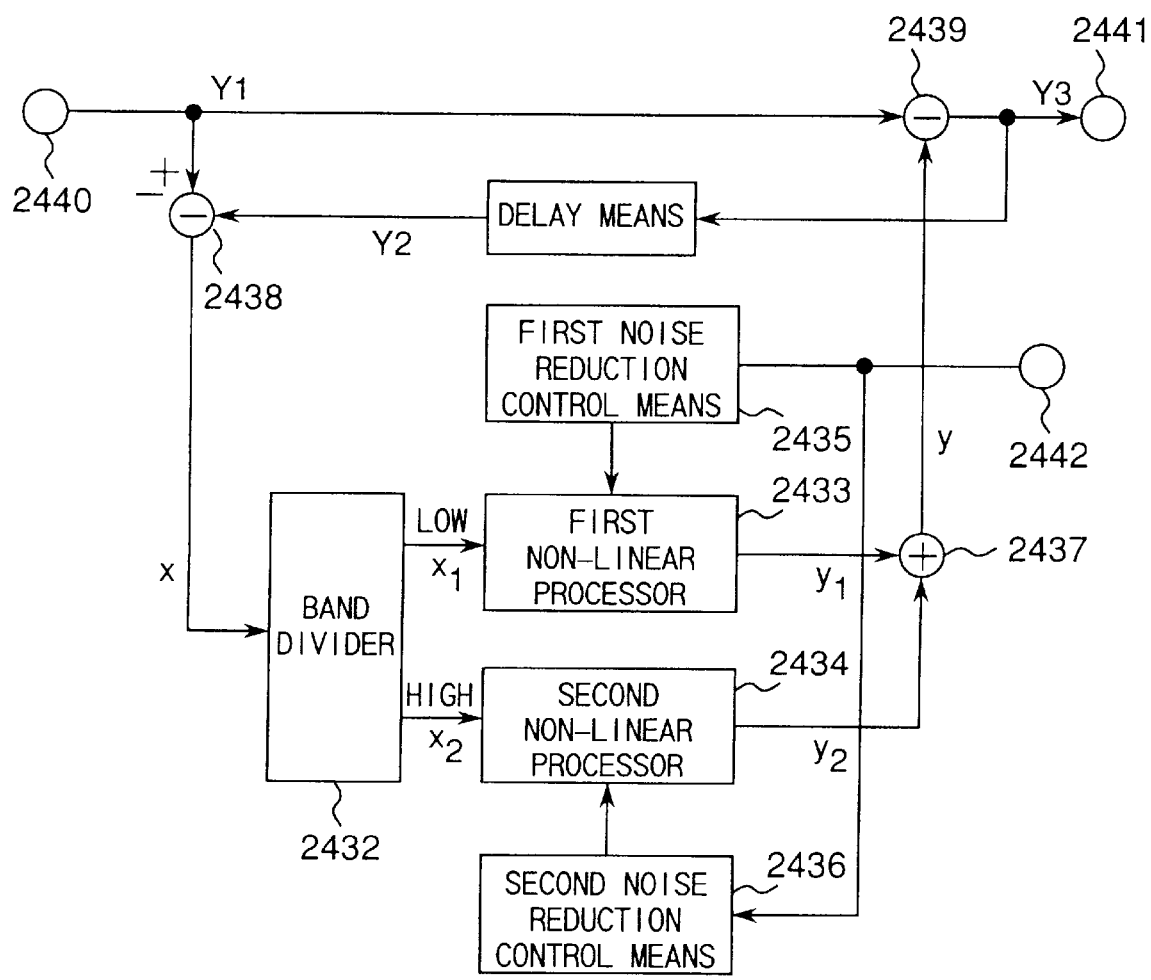
FIG. 22 is a block diagram of yet other alternative embodiments of the signal processing circuit and noise reduction control circuit in the fifth embodiment of the invention.
Figure 23:
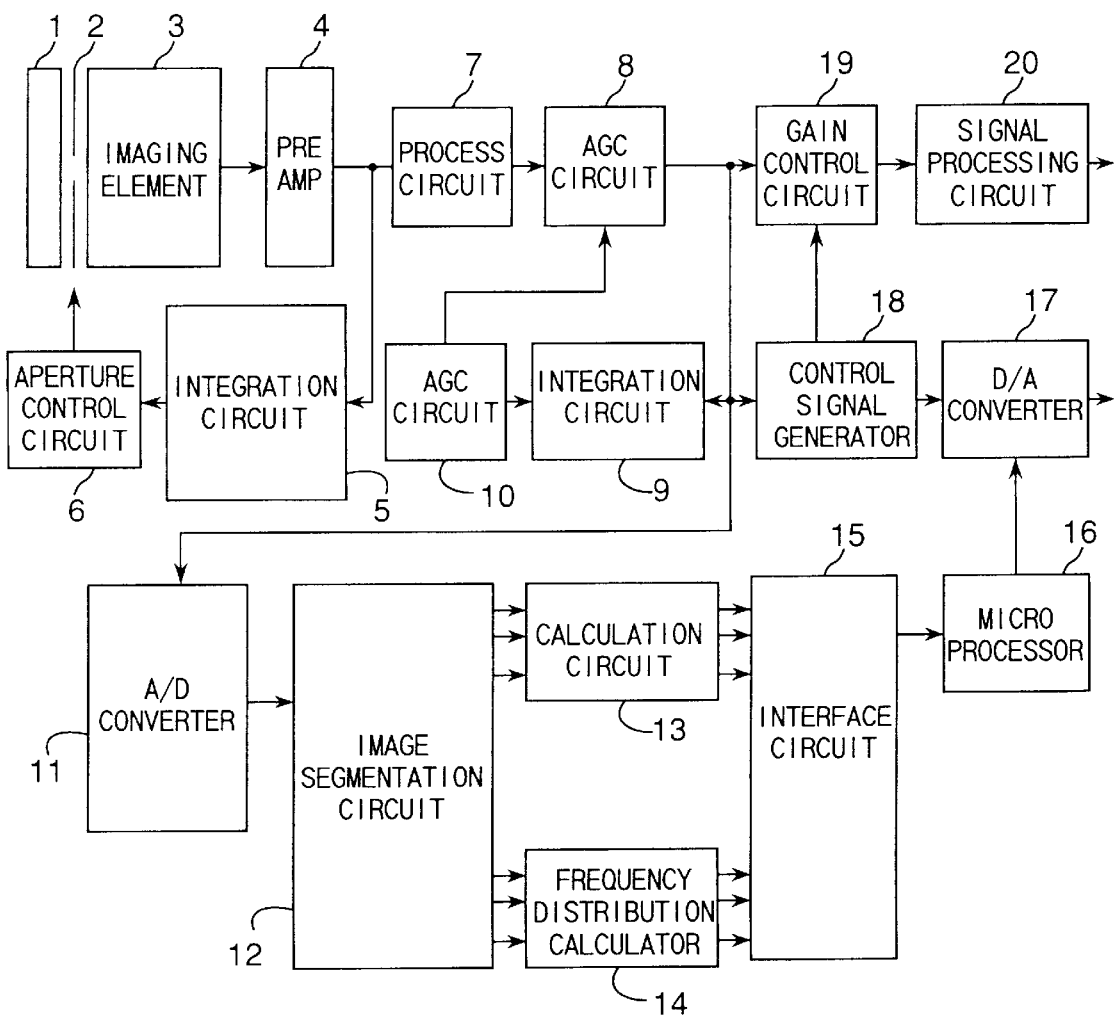
FIG. 23 is a block diagram of an imaging apparatus according to the prior art.

It should also be noted that the signal processing circuit 1608 and noise reduction control means 1606 of this configuration can be configured as a feedback-type noise reduction circuit using band division as shown in FIG. 22. Note, also, that the configuration shown in FIG. 22 can achieve a greater noise reduction effect than the feed-forward design described above even using a delay means operating at the same delay time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An imaging apparatus comprising:
   an imaging element for outputting an image signal,
   an AGC circuit for controlling the gain of the image signal output from the imaging element,
   an AGC control means for controlling an output signal level of the AGC circuit to a constant level,
   a gradation compensation means for applying gradation compensation by varying a gain of each luminance level of the image signal output of the AGC circuit based on a gradation compensation coefficient,
   a feature quantity extraction means for extracting an image feature quantity from the image signal output of the AGC circuit,
   an image evaluation means for determining the amount of backlighting and strong normal lighting from the feature quantity extracted by the feature quantity extraction means, and outputting the degree of gradation compensation to be applied, and
   a gradation compensation suppression means for suppressing the degree of gradation compensation output from the image evaluation means and determining the gradation compensation coefficient according to a control signal from the AGC control means,
   wherein the gain of the gradation compensation means is controlled according to the gradation compensation coefficient of the gradation compensation suppression means, and the gradation-compensated image signal is output.

2. An imaging apparatus according to claim 1, wherein the gradation compensation means is operable for applying gradation compensation in which the gain is greater in low luminance areas than in high luminance areas of the image signal.

3. An imaging apparatus according to claim 1, wherein the feature quantity extracted by the feature quantity extraction means is the luminance distribution in one field of the image signal.

4. An imaging apparatus comprising:
   an imaging element for outputting an image signal,
   a gradation compensation means for applying gradation compensation by varying the gain of each luminance level in the image signal output of the imaging element based on a gradation compensation coefficient,
   a signal processing circuit for applying contour enhancement signal processing to the image signal output of the gradation compensation means,
   a feature quantity extraction means for extracting an image feature quantity of the image signal output of the imaging element,
   an image evaluation means for determining the amount of backlighting and strong normal lighting from the feature quantity extracted by the feature quantity extraction means, and outputting the gradation compensation coefficient, and
   a contour signal gain control means for controlling the gain of the contour-enhanced signal output by the signal processing circuit based on the gradation compensation coefficient set by the image evaluation means,
   wherein gradation compensation is accomplished by controlling the gain of the gradation compensation means according to the gradation compensation coefficient of the image evaluation means, and
   the contour signal gain control means is operable to control the gain of the contour-enhanced signal according to the gradation compensation coefficient of the image evaluation means.

5. An imaging apparatus according to claim 4 wherein the gradation compensation means is operable for applying gradation compensation in which the gain is greater in low luminance areas than in high luminance areas of the image signal.

6. An imaging apparatus according claim 4 wherein the feature quantity extracted by the feature quantity extraction means is the luminance distribution in one field of the image signal.

7. An imaging apparatus comprising:
   an imaging element for outputting an image signal,
   an AGC circuit for controlling the gain of the image signal output from the imaging element,
   an AGC control means for controlling the output signal level of the AGC circuit to a constant level,
   a gradation compensation means for applying gradation compensation by varying the gain of each luminance level of the image signal output of the AGC circuit based on a gradation compensation coefficient,
   a signal processing circuit for applying contour enhancement signal processing to the image signal output of the gradation compensation means,
   a feature quantity extraction means for extracting an image feature quantity from the image signal output of the AGC circuit,
   an image evaluation means for determining the amount of backlighting and strong normal lighting from the feature quantity extracted by the feature quantity extraction means, and outputting the degree of gradation compensation to be applied,
   a gradation compensation suppression means for suppressing the degree of gradation compensation output from the image evaluation means and determining the gradation compensation coefficient according to the control signal from the AGC control means, and
   a contour signal gain control means for controlling the gain of the contour-enhanced signal output by the signal processing circuit based on the gradation compensation coefficient set by the gradation compensation suppression means,
   wherein the gain of the gradation compensation means is controlled according to the gradation compensation coefficient of the gradation compensation suppression means, and the contour signal gain control means is operable to control the gain of the contour-enhanced signal according to the gradation compensation coefficient of the gradation compensation suppression means.

8. An imaging apparatus according to claim 7 wherein the gradation compensation means is operable for applying gradation compensation in which the gain is greater in low luminance areas than in high luminance areas of the image signal.

9. An imaging apparatus according claim 7 wherein the feature quantity extracted by the feature quantity extraction means is the luminance distribution in one field of the image signal.

10. An imaging apparatus comprising:

an imaging element for outputting an image signal, a gradation compensation means for applying gradation compensation by varying the gain of each luminance level in the image signal output of the imaging element based on a gradation compensation coefficient, a signal processing circuit for applying noise reduction signal processing to the image signal output of the graduation compensation means, a feature quantity extraction means for extracting an image feature quantity in the image signal output of the imaging element, an image evaluation means for determining the amount of backlighting and strong normal lighting from the feature quantity extracted by the feature quantity extraction means, and outputting the gradation compensation coefficient, and a noise reduction control means for controlling the noise suppression characteristic of the signal processing circuit based on the gradation compensation coefficient set by the image evaluation means, wherein the gain of the gradation compensation means is controlled according to the gradation compensation coefficient of the image evaluation means, and the noise reduction control means is operable to control the noise suppression characteristic according to the gradation compensation coefficient of the image evaluation means.

* * * * *